(12) United States Patent
Duclos et al.

(10) Patent No.: US 8,591,215 B2
(45) Date of Patent: *Nov. 26, 2013

(54) MACHINE FOR MANUFACTURING CONTAINERS, INCLUDING A SYSTEM FOR PROVIDING ASSISTANCE WHEN CHANGING MOULDS

(75) Inventors: Yves-Alban Duclos, Octeville sur Mer (FR); José Blanchard, Octeville sur Mer (FR); Stéphane Hazard, Octeville sur Mer (FR); Fabrice Burel, Octeville sur Mer (FR); Cyrille Lefranc, Octeville sur Mer (FR); Roland Chereau, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/515,935

(22) PCT Filed: Dec. 20, 2010

(86) PCT No.: PCT/EP2010/070201
§ 371 (c)(1),
(2), (4) Date: Jun. 14, 2012

(87) PCT Pub. No.: WO2011/076714
PCT Pub. Date: Jun. 30, 2011

(65) Prior Publication Data
US 2012/0251648 A1    Oct. 4, 2012

(30) Foreign Application Priority Data
Dec. 21, 2009 (FR) ...................... 09 59305

(51) Int. Cl.
*B29C 49/56* (2006.01)
*B29C 49/28* (2006.01)
*B29C 49/78* (2006.01)

(52) U.S. Cl.
USPC ........ 425/150; 425/541; 425/451.4; 264/538; 264/542; 264/543

(58) Field of Classification Search
USPC .............. 425/540, 541, 150, 451.4, 182, 190, 425/192 R; 264/538, 542, 543, 297.5–297.8
See application file for complete search history.

(56) References Cited

U.S. PATENT DOCUMENTS

| 5,968,560 A | 10/1999 | Briere et al. |
| 6,464,486 B1 | 10/2002 | Barray et al. |

(Continued)

FOREIGN PATENT DOCUMENTS

| EP | 0 821 641 B1 | 8/2000 |
| FR | 2 646 802 A1 | 11/1990 |

(Continued)

OTHER PUBLICATIONS

International Search Report, dated Mar. 22, 2011, from corresponding PCT application No. PCT/EP20101070201.

*Primary Examiner* — Joseph S Del Sole
*Assistant Examiner* — Nahida Sultana
(74) *Attorney, Agent, or Firm* — Young & Thompson

(57) ABSTRACT

A machine (10) for manufacturing containers, includes a system (82) for providing assistance when changing moulds, including at least one module (84) which, combined with a moulding unit (24), has an actuation device (86) provided with an operating member (88) intended to cooperate with a member (52) for controlling the locking elements (55) when the moulding unit (24) occupies a specified reference position relative to the module (84), the operating member (88) being able to undergo a displacement so as to actuate the member (52) for controlling the locking elements (55) in order to cause the locking elements (55) to move towards at least one of the locked or unlocked positions and to make the mould holders (26) move towards at least one of the open or closed positions of the moulding unit (24).

18 Claims, 9 Drawing Sheets

(56) References Cited

U.S. PATENT DOCUMENTS

| | | | |
|---|---|---|---|
| 6,896,505 B2 * | 5/2005 | Towery et al. | 425/190 |
| 2004/0104517 A1 | 6/2004 | Kronseder | |
| 2005/0238753 A1 | 10/2005 | Arakelyan et al. | |
| 2006/0099294 A1 * | 5/2006 | Netsu | 425/540 |
| 2012/0306112 A1 * | 12/2012 | Tokuyama et al. | 264/40.5 |

FOREIGN PATENT DOCUMENTS

| | | |
|---|---|---|
| FR | 2 764 544 A1 | 12/1998 |
| FR | 2 843 714 A1 | 2/2004 |

* cited by examiner

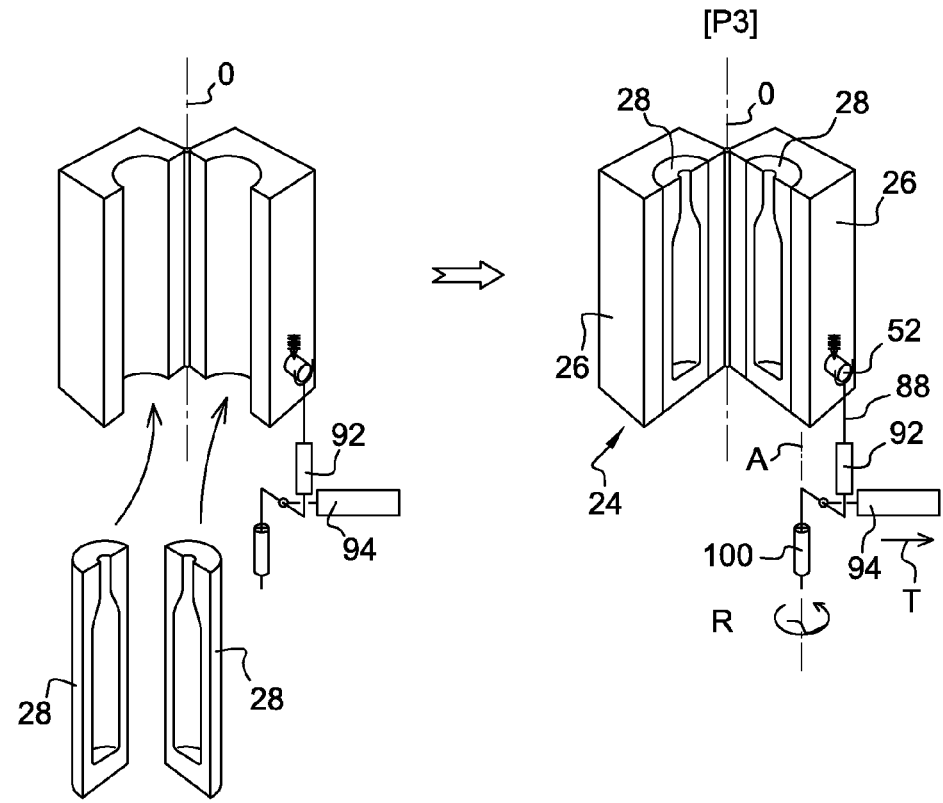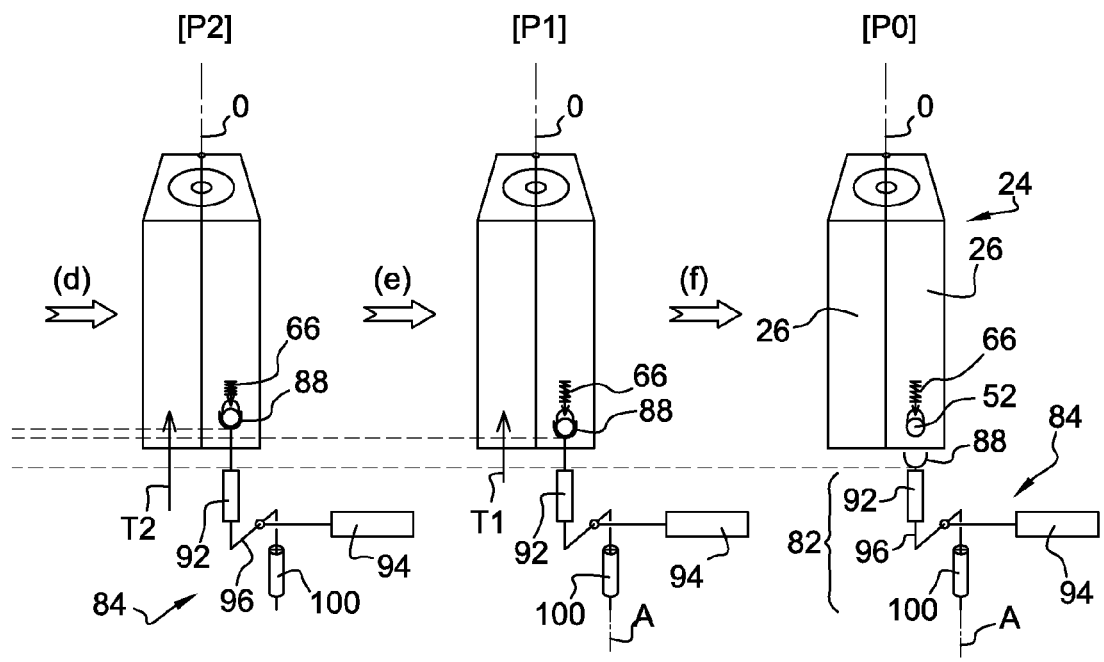
Fig. 6B

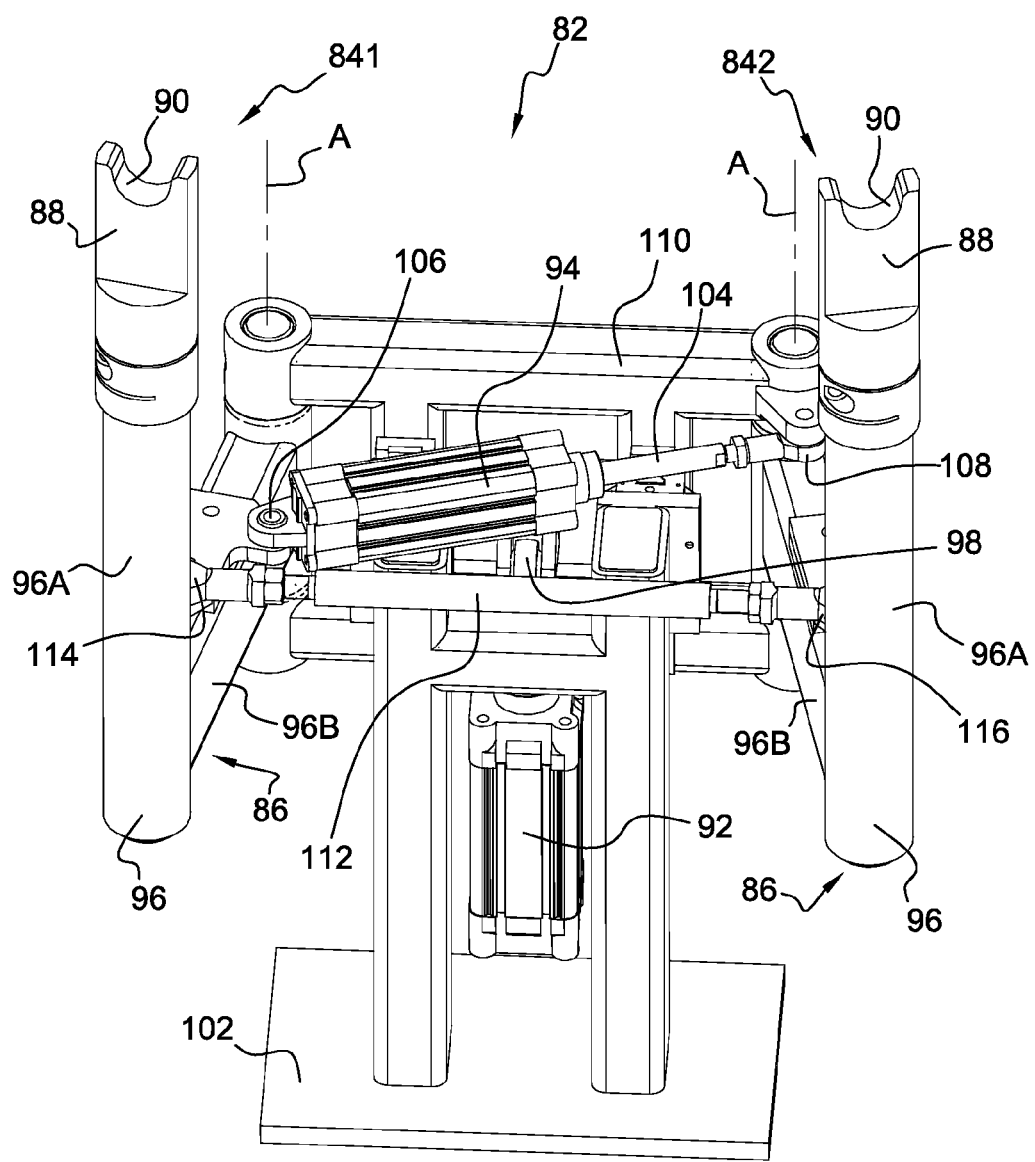
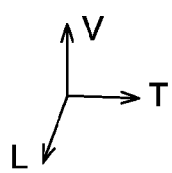

MACHINE FOR MANUFACTURING CONTAINERS, INCLUDING A SYSTEM FOR PROVIDING ASSISTANCE WHEN CHANGING MOULDS

BACKGROUND OF THE INVENTION

1. Field of the Invention

The present invention relates to a machine for manufacturing containers, including a system for providing assistance when changing molds.

The present invention relates more specifically to a machine for manufacturing containers which includes at least one molding unit including:
- at least two mold holders which are mounted movably between an open position and a closed position of the molding unit, and a mold including at least two molding elements, each of which is fixed removably to one of the mold holders, and
- a locking device of the molding unit including at least one control member capable of actuating locking means which are mounted movably between:
  - a locked position in which the mold holders of the molding unit are kept in the closed position by said locking means, and
  - an unlocked position in which the mold holders are freely movable between the closed and open positions.

2. Description of the Related Art

In the prior art there are known machines for manufacturing containers, particularly bottles of thermoplastic material, said machines being, notably but not exclusively, of the type known as "rotary".

FIG. 1 shows by way of non-limiting example a prior art installation 5 including a rotary machine 10 for manufacturing containers, in which installation 5 said machine 10 (also known as a "blow molder") is notably associated with an oven 12 for the heat treatment of the preforms 14.

The installation 5 includes a device 16 for supplying preforms (or blanks) 14 which are introduced into the installation through an entrance E which communicates with an entrance area of the oven 12.

The oven 12 includes means 18 for heating the preforms 14 which are arranged along all or part of a path, U-shaped in this case, extending from the oven entrance area into which the preforms 14 are guided by the supply device 16 to an exit area of the oven 12, in the vicinity of which a first transfer device 20 is arranged.

The first transfer device 20 is intended to transfer the heat-treated preforms 14 from the exit area of the oven 12 to an area Zi, called the insertion area, for inserting the preforms 14 into the manufacturing machine 10.

The manufacturing machine 10 includes a carousel 22 equipped with a series of circumferentially distributed molding units 24 and with blowing or stretch-blowing means (not shown) associated with said units 24.

The molding unit 24 includes two mold holders 26 which are mounted so as to be movable between an open position and a closed position of the molding unit; for example, when the molding unit 24 is of the "book-like opening" type as shown in FIG. 1, the mold holders 26 (or, in a variant, at least one of them) are mounted rotatably relative to each other about an axis O of rotation.

Each molding unit 24 includes a mold including at least two molding elements 28, each fixed removably to one of the mold holders 26.

In the closed position of the molding unit 24, the molding elements 28 are placed adjacent to each other in such a way that their inner faces form a joint plane, the coupling of the molding half-impressions of each element defining the volume, shape, appearance, and other features of the container to be produced by forming a preform.

A manufacturing machine 10 of this type can operate in different operating modes.

In one operating mode of the machine, called the production mode, the machine 10 is used in combination with the oven 12 of the installation 5 to manufacture containers.

In this operating mode of the machine 10, the carousel 22 is driven in rotation in such a way that each molding unit 24 undergoes a transformation cycle from said insertion area Zi to an area Ze, called the removal area, for the containers 14', in which a second transfer device 30 is arranged.

The second transfer device 30 is intended to transfer the containers 14', produced from the preforms 14, from the removal area Ze of the machine 10 to an exit S from the installation 5.

As shown in FIG. 1, the areas for the insertion of the preforms 14 and for the removal of the containers 14' are adjacent and are located in the front part of the machine 10 in such a way that the transformation cycle takes place over practically the whole circumference of the machine.

The installation 5 generally includes a protective enclosure 31 arranged so as to surround at least the manufacturing machine 10 and the oven 12.

In the production mode of the machine 10 shown in FIG. 1, the manufacturing of containers of plastic material, such as bottles, flasks and the like, is therefore carried out in the molding units 24 by the blow-molding or stretch-blow molding of preforms 14 which have been pre-heated in the heat treatment oven 12.

However, while the production mode is the main operating mode of the machine, the machine 10 also has another operating mode, called the intervention mode, which is equally important.

This is because said at least two molding elements 28 forming the mold and each including one half-impression are fastened to the mold holders 26 by fastening means (not shown) capable of allowing the dismounting and mounting of the elements for the purpose of changing the mold of the molding unit 24.

EP-B1-0.821.641, in the name of the present applicant, describes, notably, various improvements made to the structure of a molding unit 24 and of the mold, and also to the mold fastening means.

This document may advantageously be consulted, although it is cited purely as a non-limiting example.

Such a change of mold is required, in particular, for the purpose of manufacturing containers having different shapes and/or sizes, or for their replacement in case of damage to and/or wear of the molding elements.

The operating mode called the intervention mode, in which the production of containers by the machine is halted, is used more or less frequently, depending on the use of the machine 10.

In some cases, mold changes are very frequent, and therefore the time required to change the mold of a molding unit 24 is the subject of even more attention.

The time required to change a mold has to be multiplied by the number of molding units 24 included in the machine 10, this number being, for example, between 6 and 34 molding units.

The operations required for changing the mold of a molding unit 24 are numerous and are all performed manually by an operator, or in some cases two operators, and therefore the intervention period is often considered excessively lengthy by users, especially if frequent changes have to be made.

This is because the immobilization of the machine 10 during these operations is costly, owing to the complete stoppage of manufacturing which it entails, and consequently the mold changing operations, which are more or less frequent depending on the users, are very costly because they are lengthy and complicated.

BRIEF SUMMARY OF THE INVENTION

The object of the present invention is, notably, to resolve the aforesaid problems and, in particular, to reduce the time required to change the mold of a molding unit while improving the general conditions in the machine intervention mode, in terms of both safety and convenience for the operator.

For this purpose, the invention proposes a system for providing assistance when changing molds, which can be put selectively into a state of use associated with the operating mode of the machine called the intervention mode, said mode being, notably, intended to allow at least one operator to change a mold in all or some of the molding units of the machine.

According to the invention, the machine for manufacturing containers of the type described above is characterized in that the machine includes a system for providing assistance when changing molds, which can be in at least a standby state associated with an operating mode of the machine called the production mode, for manufacturing containers by means of the machine, and a state of use associated with another operating mode of the machine, called the intervention mode, for the purpose of at least changing the mold of said at least one molding unit, said system including at least one module associated with said at least one molding unit, said module including an actuating device which includes an operating member intended to interact with said member for controlling the locking means when the molding unit occupies a specified reference position relative to the module, said operating member being capable of being driven and thereby moved so as to actuate said member for controlling the locking means in order to cause, on the one hand, the movement of the locking means toward at least one of said locked and unlocked positions and, on the other hand, the movement of the mold holders toward at least one of said open and closed positions of the molding unit.

Advantageously, the system according to the invention allows all manual intervention by the operator to be dispensed with, for the purposes of carrying out the unlocking and the opening of the molding unit to enable the mold of said unit to be changed, in other words to enable the operations of dismounting and mounting the molding element to be carried out.

By means of the invention, the time required for the mold changing operations is considerably reduced relative to the time required previously for the same operations.

Advantageously, the system according to the invention helps to reduce the laboriousness for the operator of these operations which are tiring, repetitive and performed in an environment which is often inconvenient for the operator.

Advantageously, the system includes a number (n) of modules which is greater than or equal to two, in such a way that the same number of molding units, each associated with a module, can be handled simultaneously, thus further reducing in a very substantial way the total time required for changing the molds of all or some of the molding units of a machine.

According to other characteristics of the invention:
the device for actuating the module of the system includes first drive means intended to move the operating member selectively between at least:
  a first position associated with the locked position of the locking means of the molding unit, and
  a second position associated with the unlocked position of the locking means of the molding unit;
the operating member can be moved in translation by said first drive means, at least:
  from said first position in which said operating member interacts with the member for controlling the locking means occupying the locked position,
  toward said second position in which said operating member exerts a force, called the unlocking force, on the member for controlling the locking means, such that said locking means are brought to the unlocked position;
the operating member can be moved in translation by said first drive means, at least:
  from said second position in which said operating member interacts with the member for controlling the locking means occupying the unlocked position,
  toward said first position in which said operating member exerts a force, called the locking force, on the member for controlling the locking means, such that said locking means are brought to the locked position;
the device for actuating the module of the system includes second drive means intended to move the operating member between at least:
  said second position in which the mold holders of the molding unit are in the closed position and in which the locking means are in the unlocked position, and
  a third position in which the mold holders of the molding unit are in the open position;
the operating member can be moved in rotation by said second drive means, at least:
  from said second position in which said operating member pushes the member for controlling the locking means into the unlocked position,
  toward a third position, reached after said operating member has exerted a force, called the opening force, on the control member, such that at least one of the mold holders is made to move in such a way that the mold holders occupy said open position of the molding unit;
the operating member can be moved in rotation by said second drive means, at least:
  from said third position,
  toward said second position, reached after said operating member has exerted a force, called the closing force, on the control member, such that at least one of the mold holders is made to move in such a way that the mold holders occupy said closed position of the molding unit;
the operating member of the module of the system is capable of pivoting, between said second and third positions, about an axis of rotation which is coaxial with an axis of rotation about which at least one of the mold holders is mounted so as to be movable in rotation between said open and closed positions, respectively, of the molding unit occupying said specified reference position relative to the module;
the operating member of the device for actuating said at least one module of the system is mounted movably between at least:

a retracted position corresponding to a standby state of the system associated with an operating mode of the machine, called the production mode, for the manufacture of containers by the machine, and said first position corresponding to a state of use of the system associated with another operating mode of the machine, called the intervention mode, for the purpose of at least changing the mold of at least one molding unit, and the first drive means of at least said operating member form means for controlling the change of state of the system between said standby state and said state of use;

the system includes a control unit intended to control at least one module, said unit being capable of controlling selectively and sequentially, according to a mold changing cycle, at least said first and second drive means of the device for actuating the module of the system in the state of use, said cycle including at least:

a first phase of the cycle in which the operating member of the actuating device is successively moved from the first position to the second position and then from said second position to the third position, and a second phase of the cycle in which the operating member of the actuating device is successively moved from the third position to the second position and then from said second position to the first position;

the system includes at least two juxtaposed modules arranged in a specified area of the machine, called the intervention area;

the system includes at least two separate modules each arranged in a specified intervention area of the machine;

the system includes, respectively, first linking means which link in movement the operating members of at least two modules whose first common drive means act on said first linking means, and second linking means which link in movement said operating members of said at least two modules whose second common drive means can act on said second linking means;

the system includes, respectively, first linking means which link in movement the operating members of at least two modules whose first separate drive means can act selectively on the operating member of each of said modules, and second linking means which link in movement said operating members of said at least two modules whose second common drive means act on said second linking means;

the system for providing assistance when changing molds includes at least two modules which are controlled, simultaneously or successively, by said control unit so that each of them executes said mold changing cycle without any change in the specified reference positions of the associated molding units.

BRIEF DESCRIPTION OF THE DRAWINGS

Other characteristics and advantages of the present invention will be made clear by the following detailed description, the comprehension of which will be facilitated by reference to the drawings, in which:

FIGS. 6A and 6B are, respectively, a set of schematic views each showing the module of a system according to the first embodiment and the associated molding unit and which show successively, in FIG. 6A, the steps of the first phase of the cycle and, in FIG. 6B, the second phase of the mold changing cycle;

FIGS. 7 and 8 are, respectively, a front view and a three-quarter rear perspective view showing a system according to a second embodiment of the invention which includes two juxtaposed modules with the first and second common drive means;

DETAILED DESCRIPTION OF THE PREFERRED EMBODIMENTS

Figure 1:
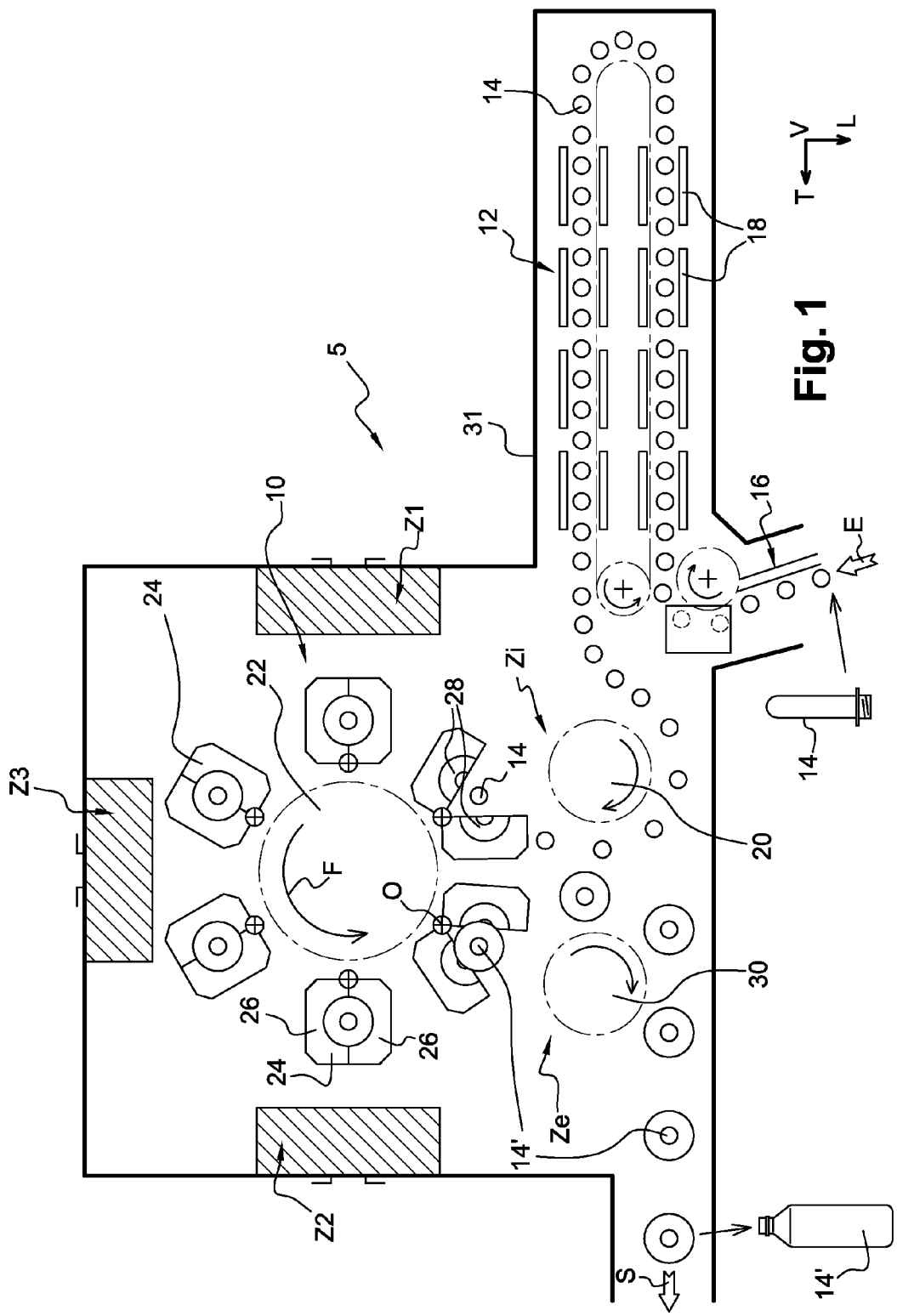
FIG. 1 is a view from above, showing in a schematic way an installation according to the prior art including an example of a machine for manufacturing containers and capable of being equipped with a system for providing assistance when changing molds according to the invention.

In the remainder of the description, the longitudinal, vertical and transverse directions are used according to the frame of reference (L, V, T) shown in the drawings, without limiting intent.

By convention, the longitudinal and transverse directions are determined in a fixed way relative to the mold holders, in such a way that the open or closed position occupied has no effect on said directions.

Other terms which are used without limiting intent are "front" and "rear" with reference to the longitudinal direction, "upper" and "lower" with reference to the vertical direction, and "left" and "right" with reference to the transverse direction.

Figure 3:
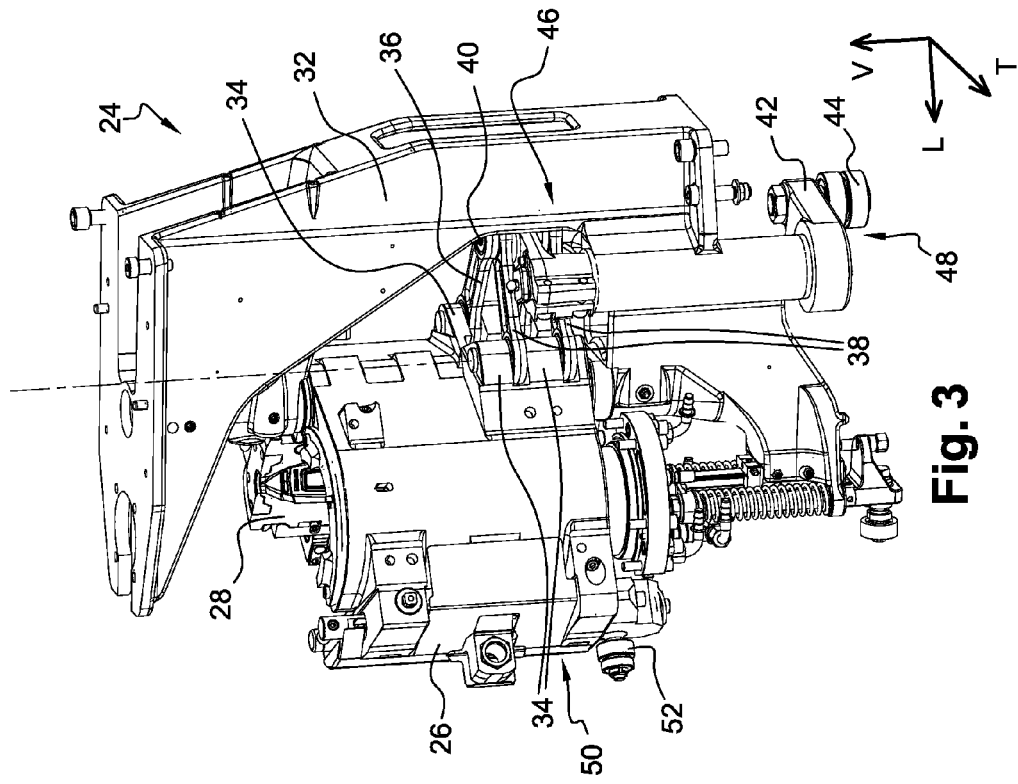
FIGS. 2 and 3 are perspective views showing an exemplary embodiment of a molding unit intended to be fitted in one of the stations of a machine according to FIG. 1, said unit being shown, respectively, in a three-quarter front view in the closed position, and in a three-quarter rear view in the open position.
Figure 2:
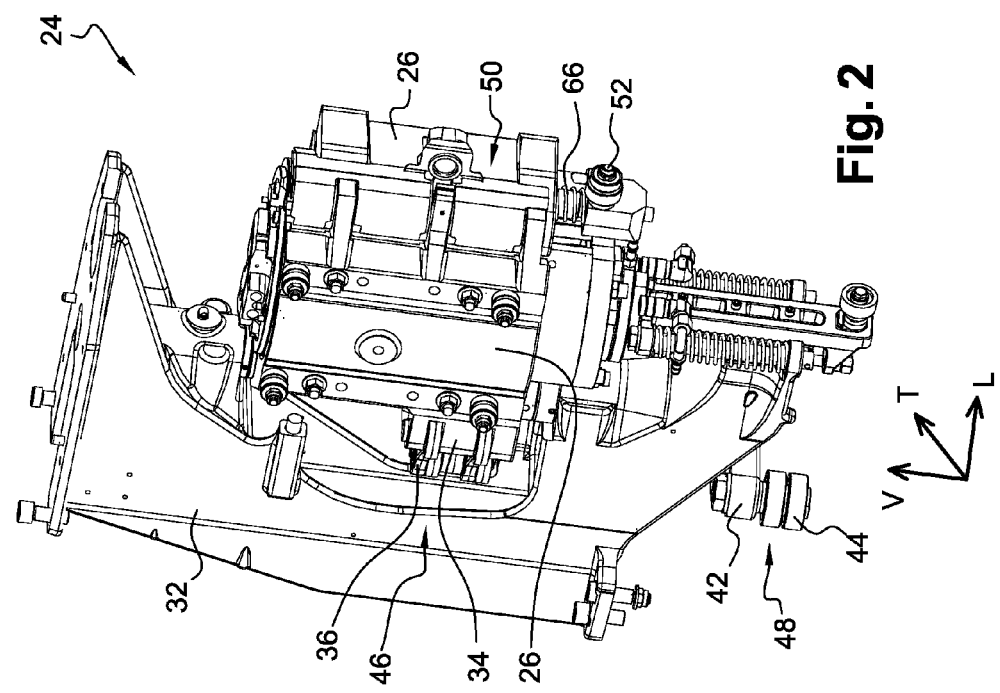

FIGS. 2 and 3 show an exemplary embodiment of a molding unit 24 which can be mounted on a carousel 22 of a machine 10 for manufacturing containers of the type which is shown in FIG. 1 and which is described in the preamble in relation to the operating modes of the machine 10.

A molding unit 24 of this type thus forms one of the blow molding or stretch-blow molding stations of the machine 10 which includes a series of "n" molding units 24, distributed at regular angular intervals around the carousel 22 of the machine 10.

Reference may be made to FR-2.764.544, for example, for fuller details of the aforesaid blow molding or stretch-blow molding means, which in some cases are also called "blowing nozzles" and are made in this form.

The molding unit 24 includes two mold holders 26 which are mounted movably relative to each other between an open position and a closed position of the molding unit.

The molding unit 24 is supported by a bracket 32 intended to be fastened to the carousel 22 of the machine 10.

More precisely, the mold holders 26 are made in the form of two carrying structures mounted pivotably about the axis O of rotation, the axis O of rotation extending vertically in this case relative to the frame of reference (L, V, T).

Because of the kinematics of the mold holders 26, a molding unit 24 of this type is also called a "book-like opening" mold.

In a variant, only one of the mold holders 26 is mounted movably, while the other mold holder 26 is fixed, the movable mold holder 26 being controlled so as to move between said open and closed positions.

As shown in FIG. 3 which illustrates the molding unit 24 in the open position, the molding unit 24 includes a mold including at least two molding elements 28, each provided with a half-impression (visible on the half-mold present and in the fastened position on the mold holder 26).

However, when the container to be manufactured has a base with a complex shape, particularly a petaloid shape, demolding problems are known to be liable to occur.

For this reason, a separate mold base is advantageously provided. In this case, therefore, the mold includes three distinct elements, namely two molding elements 28 and a mold base (not shown) including a base impression of the container which is complementary to the half-impressions in said molding elements 28.

In a variant, the mold may have no such mold base, and in this case it is made in the form of only two molding elements 28.

Additionally, regardless of whether the mold is made in two elements or in three elements with a mold base, the design of the two molding elements 28 may also differ, notably if the molding element incorporates other functions, such as cooling, as well as carrying part of the impression.

The molding elements 28 of the mold are preferably designed in an identical way to that described in EP-B1-0.821.641.

According to this document, each of the two molding elements 28 is made in two separate pieces, namely, according to the terminology used in this document, a shell including part of the impression, and a shell holder which is intended to be mounted on a mold holder, and has a housing in which the shell is received and fastened by fastening means.

Consequently, the term "molding element 28" is used in the present description in a generic way and incorporates, notably, the different variant embodiments of a mold described above.

Each mold holder 26 includes hinge means arranged at the rear according to the longitudinal direction.

Preferably, the hinge means of the mold holders 26 include outer lugs 34 which are spaced apart from the axis O of rotation, one of these lugs being provided on each mold holder 26.

The lugs 34 of each mold holder 26 are connected pivotably to one of the link rod ends of at least one link rod 36 for the left-hand mold holder 26 and of at least one link rod 38 for the right-hand mold holder 26, respectively.

The other end of each link rod 36, 38 is connected in a freely pivotable way to a common hinge shaft 40 which is arranged, longitudinally speaking, at the rear of the molding unit 24.

According to whether the common hinge shaft 40 is moved approximately linearly in one direction, longitudinal in this case, to bring it toward the axis O of rotation, or is moved away therefrom, either the mold holders 26 are moved toward each other, thereby closing the molding unit 24, or the mold holders 26 are moved away from each other, thereby opening the molding unit 24.

The mold holders 26 can thus be moved away from each other by pivoting about the axis O of rotation between at least a closed position and an open position.

This movement of the common hinge shaft 40 is controlled by actuating means, of the cam and roller type for example. Preferably the cam and roller actuating means include lever means interposed between the cam and the roller to form a stroke gain device.

In the exemplary embodiment, the common hinge shaft 40 is fixed to the end of a control arm 42 forming a lever, the free other end of this arm supporting follower means which, being formed by at least one roller 44, can interact with guiding means such as a cam.

The hinge means and the associated actuating means form a device 46 for opening and closing the molding unit 24, including a control member 48 formed by the arm 42 and the roller 44 which can control the movement of the mold holders 26 between the open and closed positions.

Further information can be obtained from FR-A1-2.843.714, for example, which concerns, notably, control means of this type for controlling the opening and closing of a similar molding unit.

The molding unit 24 includes a device 50 for locking the unit, including a member 52 for controlling the means 55 for locking the molding unit 24 in the closed position.

The locking device 50 is arranged in the front part, longitudinally speaking, in other words at the opposite end from the axis O of rotation and the means of the device 46 for opening and closing the molding unit 24, and is intended to lock the two mold holders 26 in the closed position.

The locking device 50 includes, for example, two half-locks, one of the male type and one of the female type, which are associated with the mold holders 26 and can interact with each other to hold the molding unit 24 in the closed position.

Thus, the locking device 50 serves, notably, to prevent, in the production mode, any unexpected opening during the operations of transformation by forming of the preform, preferably by blow molding or stretch-blow molding.

For information, it may be noted that the final blowing pressures may be as much as 40 bar.

Figure 4:
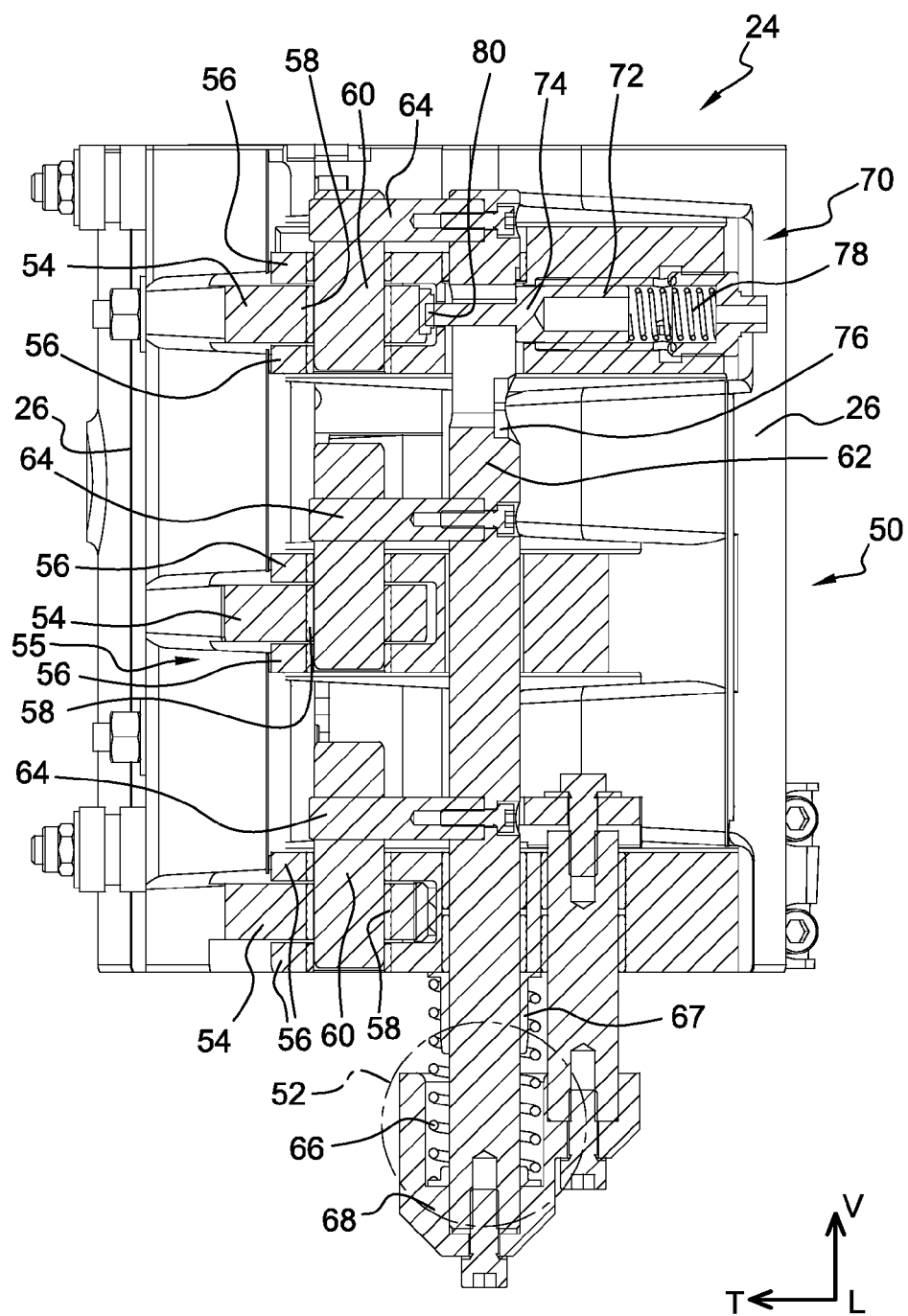
FIG. 4 is a sectional view, which shows a detail of the structure of an exemplary embodiment of a locking device of a molding unit, said locking device including a mechanism for securing the locking means in the unlocked position, and which illustrates the locking device in the locked position and the associated securing mechanism in the inactive position.

The locking device 50 is shown in greater detail in the cross section of FIG. 4.

Each of the half-locks includes at least one projecting branch, preferably, in this case, single branches 54 for the half-lock of the left-hand mold holder 26 and double branches 56 for the half-lock of the right-hand mold holder 26.

The respective branches 54, 56 of the half-locks extend transversely toward each other and are vertically offset from each other in such a way that, in the closed position as shown in FIG. 4, the branches interpenetrate.

Thus each branch 54 is received between the two branches 56 which are positioned vertically above and below it.

Preferably, each branch 54 of the female half-lock includes an opening 58 which extends along a vertical axis, passing through said branch 54, and each branch 56 of the male half-lock supports a locking finger 60 in a vertically slidable way.

The locking device 50 includes drive means 62 which are linked in movement, in a sliding movement in this case, with the locking fingers 60 which form, together with the complementary openings 58, the locking means 55 mounted movably between a locked position and an unlocked position.

Advantageously, each locking finger 60 is fixed to a link arm 64 which is itself fixed to the drive means 62 with respect to movement.

The sliding of the drive means 62 between the locked position (the low position) and the unlocked position (the high position) is controlled by the control member 52, preferably formed by a roller, fixed to the drive means 62, such as a shaft.

Thus the device 50 for locking the molding unit 24 includes a member 52 for controlling the locking means 55 which are mounted movably between:

- a locked position in which the mold holders 26 of the molding unit 24 are kept in the closed position by said locking means 55, and
- an unlocked position in which the mold holders 26 are freely movable between the closed and open positions.

In the operating mode of the machine called the production mode, the control member 52 formed by the roller (shown in outline in FIG. 4) is intended to interact with complementary cam means to control said locking means 55 of the locking device 50 selectively between said locked and unlocked positions.

With reference to FIG. 1, cam means of this type are arranged in a machine 10 in the vicinity of the area Zi for the insertion of the preforms 14 and the area Ze for the removal of the containers 14', for the purpose of actuating the roller forming the member 52 for controlling the locking device 50.

In a known way, other cam means are also arranged in the same areas Zi and Ze for actuating the control member 48, formed in this case by the arm 42 and the roller 44, of the opening and closing device 46, so as to selectively control the opening and closing of the molding unit 24 in order to allow a preform 14 to be inserted or to allow a container 14' to be removed.

Advantageously, the locking device 50 includes resilient return means 66 which can automatically return the locking means 55 toward the locked position.

Preferably, the means 66 are formed by a resilient return spring through which passes centrally the shaft forming the drive means 62, which bears at one of its ends on a cup 67 and at the other end on a support 68 which is fixed to the drive means 62 and carries the control member 52.

For further details of the structure and operation of a locking device 50 of this type, reference may be made, for example, to FR-2.646.802 which describes a lock of generally similar design.

Advantageously, the locking device 50 of the molding unit 24 includes a securing mechanism 70 which is associated with the locking means 55.

A securing mechanism 70 of this type is shown more particularly in FIG. 4.

Advantageously, the mechanism 70 includes securing means 72, such as a sliding piece, which can be controlled selectively between an inactive position (not shown) which is associated with the locked position of the locking device 50, and an active securing position (FIG. 4) which is associated with the unlocked position of the locking device 50.

The active securing position is the position in which said securing means 72 immobilize the locking means 55 in the unlocked position.

Preferably, the securing means 72 include a male securing part formed by a pin 74 which can penetrate into a complementary female part of the drive means 62 which in this case is formed by a recess 76.

Because of the shape coupling between the pin 74 of the securing means 72 and the recess 76 of the drive means 62, the drive means 62 are immobilized and are then no longer able to slide toward the locked position, in the presence or in the absence of the application of an unlocking force to the control member 52.

In the absence of the securing action of the mechanism 70, this return to the locked position would be automatically brought about by the resilient return means 66.

In this case, the securing means 72 are mounted movably in translation in the transverse direction, in other words orthogonally to the vertical direction in which the drive means 62 of the locking means 55 extend, between said inactive position and said active securing position.

Advantageously, the securing mechanism 70 includes a member 78 for the resilient return of the securing means 72 toward the active securing position.

Advantageously, the securing means 72 can be moved, in opposition to said resilient return member 78, from the active position toward the inactive position by a control element.

Preferably, the control element is formed by one of the branches 54 which can interact with a finger 80 fixed to the securing means 72 so as to cause the release of the mechanism 70 automatically when the mold holders 26 of the molding unit 24 are closed.

The finger 80 projects transversely beyond the male part formed by the pin 74 and as far as the housing delimited by the branches 56 in which the branch 54 is intended to be received in the closed position, the end of said branch 54 then interacting with the end of said finger 80 so as to cause the securing means 72 to slide transversely from the active securing position toward the inactive position, in opposition to the resilient return member 78.

Consequently, from the start of the opening of the mold holders 26, when the branch 54 is disengaged from between the branches 56 and ceases to push on the finger 80, the securing means 72 are automatically returned toward the active securing position in which the pin 74, inserted into the recess 76, immobilizes the locking means 55 in the unlocked position.

Clearly, the locking device 50 described and illustrated in FIG. 4 is shown only by way of non-limiting example.

According to the invention, the machine 10 for manufacturing containers, notably bottles of thermoplastic material, described above is characterized in that it includes a system 82 for providing assistance when changing molds.

Different embodiments of such a system 82 according to the invention will now be described, this system being, for each of said embodiments, notably but not exclusively capable of being used in a machine 10 according to FIG. 1, which includes at least molding units 24 according to FIGS. 2 and 3.

Preferably, the molding units 24 are each provided with a locking device 50 of the type described and illustrated in FIG. 4.

The machine 10 includes a system for providing assistance when changing molds, including at least one module 84 associated with at least one molding unit 24, said module 84 including an actuating device 86 which includes an operating member 88 intended to interact with said member 52 for controlling the locking means 55 of the locking device 50 when the molding unit 24 occupies a specified reference position relative to said at least one module 84 of the system 82, said operating member 88 being capable of being driven and thereby moved so as to actuate said member 52 for controlling the locking means 55, on the one hand, to cause the movement of the locking means 55 toward at least one of said locked or unlocked positions and, on the other hand, to cause the movement of the mold holders 26 toward at least one of said open or closed positions of the molding unit 24.

Advantageously, the system 82 can be used to carry out in an automatic way the operations of unlocking/locking and opening/closing at least one molding unit 24 used by the system, for the purpose of changing the mold, in other words the molding elements 28, with or without mold bases, of said unit.

The intervention of at least one operator is therefore limited to the operations of dismounting and mounting the mold, in other words acting on the fastening means of the molding elements 28 and then changing these elements.

Because of this, the total time required to change a mold is substantially reduced compared with the time previously required to carry out the same operations manually in the absence of the system.

Advantageously, in the state of use and in the stand-by state, said at least one module 84 of the system 82 is arranged generally below said at least one associated molding unit 24 carried by the carousel 22, providing excellent overall convenience for the operator.

More specifically, when the molding unit 24 occupies a specified reference position relative to said module 84 according to the invention for the purpose of changing a mold, the surrounding area is left completely unobstructed, thus facilitating the work of the operator.

The system 82 therefore plays a part in the improvement of convenience for the operator assigned to work on the machine 10, notably for the purpose of changing all or some of the molds.

Advantageously, the system 82 can be in at least:
- a stand-by state associated with the operating mode of the machine 10, called the production mode, for manufacturing containers by means of the machine, and
- a state of use associated with another operating mode of the machine 10, called the intervention mode, for the purpose of at least changing the mold of the molding unit 24.

The system 82 for providing assistance when changing molds can be used selectively for the purpose of changing at least one mold of a molding unit 24, this use taking place only when the machine 10 is in the special operating mode, called the intervention mode, and commencing initially with a change from the standby state to the state of use of said system 82.

Conversely, when the intervention on the machine 10 is completed, the change from the state of use to the standby state of said system 82 is completed and precedes the return from the operating mode, called the intervention mode, to the so-called production mode.

A description will now be given of a first embodiment of the invention, called a "single station" embodiment, because the system 82 includes a single module 84 intended to handle an associated molding unit 24 during a complete mold changing cycle.

Figure 5:
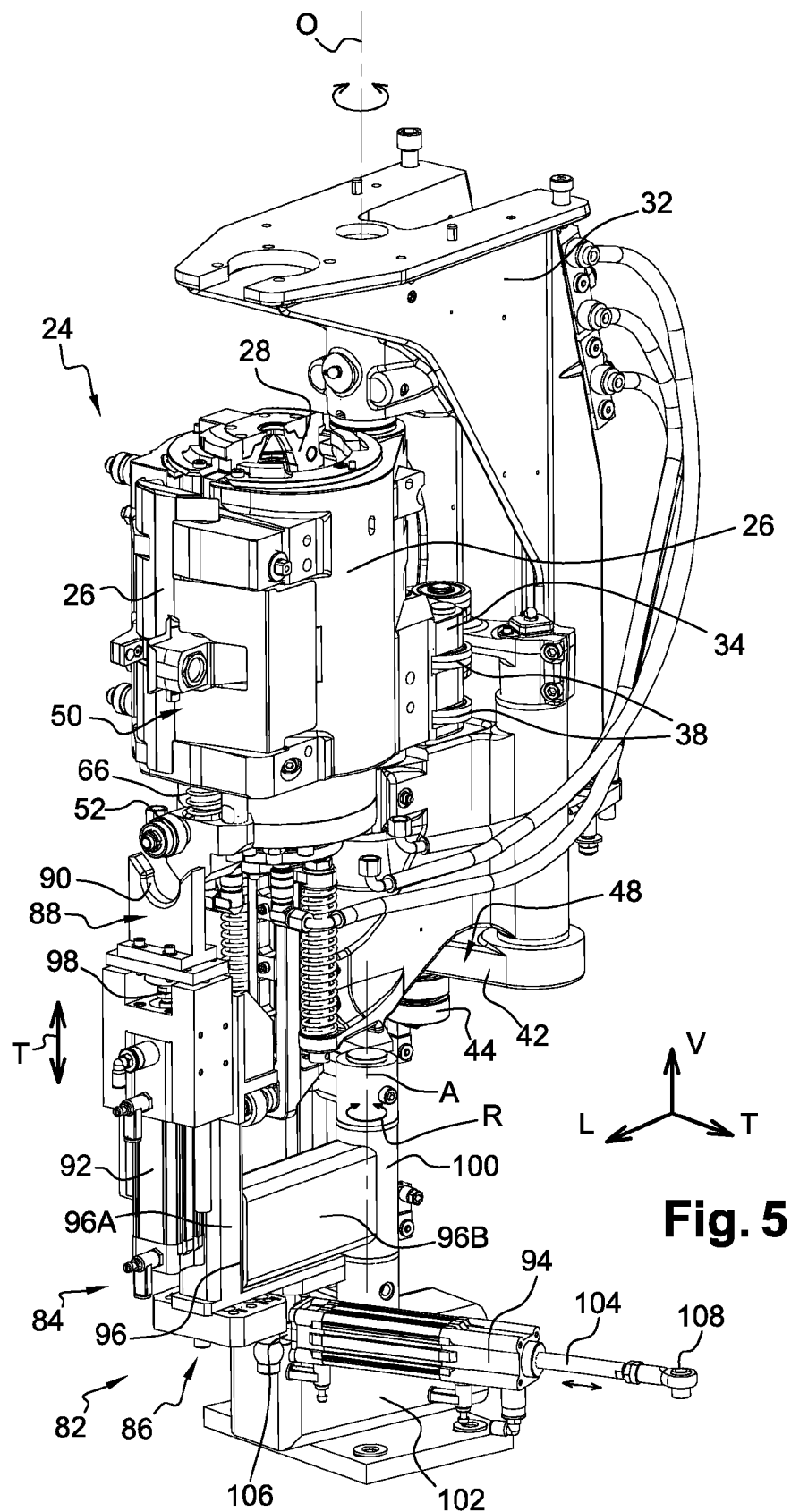
FIG. 5 is a perspective view which shows a molding unit according to FIGS. 2 and 3 and a module according to a first embodiment, called the single-station embodiment, of the system for providing assistance when changing molds according to the invention, and which illustrates said unit in a specified reference position relative to the module and said system in the standby state, the operating member of the device for actuating the module occupying a retracted position.

In this first embodiment, shown in FIG. 5, the system 82 for providing assistance when changing molds of the machine 10 includes a module 84 associated with a molding unit 24 of the machine 10.

The module 84 includes an actuating device 86 including the operating member 88 intended to interact with said member 52 for controlling the locking means 55 when said associated molding unit 24 occupies a specified reference position relative to said module 84.

Said operating member 88 can be driven and thereby moved so as to actuate said member 52 for controlling the locking means 55.

As shown in FIG. 5, the operating member 88 includes a gripping part provided with a housing 90 which is complementary to the control member 52 to be actuated.

Preferably, the housing 90 of the operating member 88 is generally semicircular and U-shaped, opening vertically upward toward the control member 52, formed in this case by a roller intended to be received in said housing 90 for its actuation.

Advantageously, the housing 90 is flared in the vicinity of its opening to facilitate both the gripping and the release of the control member 52.

During the mold changing cycle, the operating member 88 is intended to be driven and thereby moved in order to cause, on the one hand, the movement of the locking means 55 toward at least one of said locked and unlocked positions and, on the other hand, the movement of the mold holders 26 toward at least one of said open and closed positions of the molding unit 24.

For this purpose, the device 86 for actuating the module 84 of the system 82 includes, primarily, first means 92 for driving the operating member 88.

The first drive means 92 are intended to move the operating member 88 selectively between at least:
- a first position P1 associated with the locked position of the locking means 55 of the molding unit 24, and
- a second position P2 associated with the unlocked position of the locking means 55 of the molding unit 24.

As described above in relation to FIG. 4, the device 50 for locking the molding unit 24 in the closed position is of the type in which the locking means 55 are formed by complementary openings 58 and locking fingers 60 which are linked to the drive means 62.

In a locking device 50 of this type, the control member 52 is intended to drive said drive means 62 in such a way that they slide, in a vertical direction in this case, in order to move the locking fingers 60 between said locked and unlocked positions.

Advantageously, the operating member 88 can therefore be moved in translation by said first drive means 92 at least between said first and second positions P1, P2.

The device 86 for actuating the module 84 of the system 82 also includes second means 94 for driving the operating member 88.

The second drive means 94 are intended to move the operating member 88 between at least:
- said second position P2 in which the mold holders 26 of the molding unit 24 are in the closed position and in which the locking means 55 are in the unlocked position, and
- a third position P3 in which the mold holders 26 of the molding unit 24 are in the open position.

As described previously in relation to FIGS. 2 and 3, the molding units 24 of the machine 10 are of the type including two mold holders 26 mounted movably relative to each in rotation about the axis O of rotation between said open and closed positions.

Advantageously, the operating member 88 can therefore be moved in rotation by said second drive means 94 at least between said second and third positions P2, P3.

Advantageously, the first and second drive means 92, 94 are formed by actuators each of which can be controlled selectively, notably by a control unit, in order to control the movements of the operating member 88.

Preferably, the drive means 92, 94 are formed by jacks, such as a hydraulic or pneumatic jack, forming these actuators, or alternatively an electric motor actuator.

Advantageously, the first and second drive means are in this case pneumatic jacks using an energy source which is present in such a blow molding machine and molding unit 24 and which is thus available to supply the drive means 92, 94.

According to the first embodiment shown in FIG. 5, the operating member 88 has a support part 96 of overall L-shape which includes, respectively, a first vertically oriented branch 96A and a second horizontally oriented branch 96B.

Preferably, the first branch 96A of the support part 96 of the operating member 88 can support the first drive means 92, such as a jack, which have an actuating rod 98, which is mounted vertically slidably in the direction of the double arrow T shown on FIG. 5, and which has a free end capable of acting on the operating member 88 including the housing 90 so as to cause its movement in translation between said first and second positions P1 and P2 in order to actuate the member 52 for controlling the locking means 55.

Preferably, the second longitudinal branch 96B of the support part 96 includes a first end, located in this case near the front, which is connected to the lower end of the first vertical branch 96A, and a second end, located near the rear, which is connected to a pivot 100.

The pivot 100 forms, by means of the support part 96, an axis A of rotation of the operating member 88, which is intended to pivot under the action of the second drive means 94 between said second and third positions P2 and P3.

The pivot 100 includes at its lower end a fastening base 102, intended notably to allow its anchoring to the ground or to a supporting structure connected to the ground, or, in a variant, connected to the machine 10, and including holes for this purpose for the passage of fastening members such as screws.

The second drive means 94, such as a jack, include an actuating rod 104 and are linked to the second support branch 96B by a first pivoting link 106 and to a fixed element by a second pivoting link 108.

As a result of this arrangement, when the actuating rod 104 slides, the second drive means 94 bear on the second support branch 96B, at the position of the first link 106, with a pushing or tractive force such that the second branch 96B of the support part 96 of the operating member 88 is made to pivot in the direction of the double arrow R shown on FIG. 5 around the pivot 100.

The operating member 88 of the module 84 of the system 82 can pivot about said axis A of rotation defined by the pivot 100, notably between said second and third positions P2 and P3.

Advantageously, the axis A of rotation of the pivot 100 is coaxial with said axis O of rotation about which at least one of the mold holders 26 is mounted movably in rotation between said open and closed positions of the molding unit 24.

Advantageously, the system 82 includes a control unit (not shown) intended to control at least one module 84, which in this first embodiment is the module 84 of the system 82.

The control unit of the system 82 can selectively control the system 82 for providing assistance when changing molds, and more particularly it can selectively control the changes of state of the system 82 between the standby state and the state of use.

The control unit of the system 82 can control said change of state of the system 82 sequentially according to a mold changing cycle, as a function, notably, of the operating mode of the machine 10 and at least said first and second drive means 92 and 94 of the device 86 for actuating the module 84 of the system 82 in the state of use.

Before the start of said mold changing cycle, the machine 10 is controlled so as to modify its operating mode and, as will be evident, the state of the system 82 is then controlled so as to change from the standby state to the state of use.

The mold changing cycle controlled selectively and sequentially by the control unit of the system 82 in the state of use includes at least:
 a first phase of the cycle in which the operating member 88 of the actuating device 86 is successively moved from the first position P1 to the second position P2 and then from said second position P2 to the third position P3, and
 a second phase of the cycle in which the operating member 88 of the actuating device 86 is successively moved from the third position P3 to the second position P2 and then from said second position P2 to the first position P1.

For example, if the machine 10 is in the operating mode for the manufacture of containers 14', the machine 10 is controlled so as to change from this mode to the operating mode called the intervention mode.

In the case of a rotary machine 10 of the type illustrated in FIG. 1, the carousel 22 is caused to rotate by motorized drive means (not shown) which are controlled by a control unit (not shown).

In the operating mode of the machine called the production mode, used for the manufacture of containers by the machine, the operating speed of the machine 10 is thus determined by the speed of rotation of the machine.

In a machine 10 according to the prior art, the rotation of the carousel 22 is stopped either by stopping the motorized drive means, the carousel 22 then stopping by itself after a given time interval, or by stopping the motorized drive means and actuating braking means associated with the carousel 22 in order to stop the machine 10 rapidly.

Additionally, in the prior art, for the purpose of changing a mold, the molding unit 24 was brought to the desired intervention area by the operator who controlled the rotation of the carousel 22 in successive steps, by means of a remote control linked to the control unit, until the desired molding unit 24 of the series was positioned approximately in said intervention area.

Advantageously, the control unit of the machine 10 controls the rotation of the machine 10 to provide the transition from said production mode to the operating mode called the intervention mode.

For this purpose, the control unit controls the drive means of the carousel 22 and, if necessary, a speed control unit, in order to slow down said carousel 22.

Advantageously, a given molding unit 24 among the molding units 24 of the machine 10 is thus made to occupy a specified reference position relative to the module 84.

In a machine 10 for manufacturing containers, the different circumferentially distributed molding units 24 are advantageously all identified, for example by a number 1, 2, 3, . . . , according to the total number of units in the series.

This identification advantageously allows traceability to be established both in the operating mode called the production mode of the machine 10 and during the mold changes carried out in the operating mode called the intervention mode.

Thus each of the molding units 24 of the series included in the machine 10 is accurately identified, as is the mold which it includes.

The control unit of the machine 10 can be used to provide positional feedback control so as to stop the machine 10 when said given molding unit 24, for example the first unit (No. 1), occupies said specified reference position.

In this context it should be noted that, for a machine 10 of the rotary type, the distance between two consecutive molding units 24 is generally called the "pitch" and that the pitch is a function of the number of molding units 24 of the series which are distributed at regular angular intervals over the 360° of the circumference of the carousel 22.

Figure 6A:
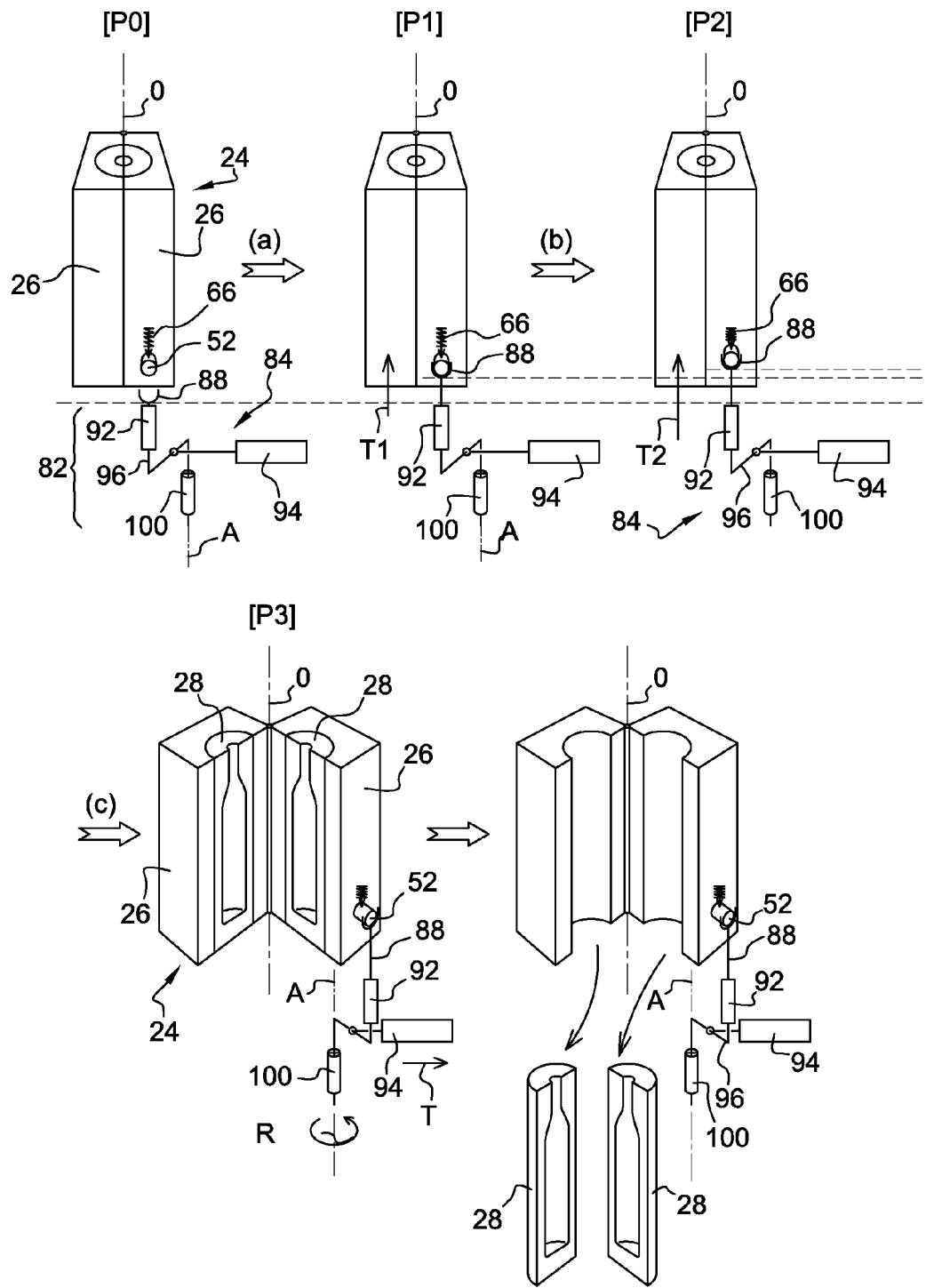

FIGS. 6A and 6B show said first and second phases of the mold changing cycle assisted by the system 82 including a module 84 intended to handle an associated molding unit 24 occupying said specified reference position relative to the module.

It should be noted that, when the machine 10 is in this operating mode, called the production mode, the system 82 is in a standby state in which no interference is possible between the system 82 and the molding units 24 of the machine 10.

As soon as said molding unit 24 occupies the specified reference position relative to the system 82 and the machine 10 has been stopped to keep it there, the system 82, or more specifically the control unit of the system 82, is controlled so as to carry out said mold changing cycle.

In a first stage (a) of the first phase of said mold changing cycle, the system 82 is controlled to change its state, in other words to change from its existing standby state to the state of use.

As indicated above, said state of use of the system 82 is associated with the operating mode of the machine, called the intervention mode, which is used particularly for the purpose of changing the molds of all or some of the molding units 24 of the machine 10.

Preferably, the operating member 88 of the device 86 for actuating the module 84 is mounted movably between at least:
- a retracted position P0 corresponding to said standby state of the system 82 associated with an operating mode of the machine 10, called the production mode, for the manufacture of containers by the machine, and
- said first position P1 corresponding to the state of use of the system 82.

Advantageously, the first drive means 92 of said operating member 88 thus form means for controlling the change of state of the system 82 between said standby state and said state of use.

In a variant which is not illustrated, the system 82 is mounted movably relative to the machine 10 and to the molding units 24, between at least one rest position corresponding to the standby state and a working position corresponding to the operating state.

In this case, the system 82 is preferably made in the form of a motorized carriage which can be controlled selectively to move between said retracted and advanced positions.

As a result of this arrangement, in the rest position according to the variant as with the retracted position P0 according to the embodiments, the operating member 88 of the at least one module 84 does not interfere with said molding units 24 when the system 82 is in the standby state and the machine 10 is driven in rotation in its operating mode called the production mode.

More precisely, said at least one operating member 88 is then, in particular, unable to come into contact with a member 52 for controlling a locking device 50 of one of the molding units 24.

As shown in FIG. 6A, since the molding unit 24 is immobilized in said specified reference position, and the first stage (a) of the first phase of the mold changing cycle therefore entails the movement in translation, by sliding upward in this case, of the operating member 88 from the retracted position P0 to said first position P1.

For this purpose, the control unit of the system 82 controls the first drive means 92 in order to move the actuating rod 98 along a first stroke T1 corresponding to a movement of the operating member 88 from the retracted position P0 toward the first position P1.

The first position P1 is a position in which said operating member 88 interacts with the member 52 for controlling the locking device 50 of the associated molding unit 24 which occupies the specified reference position.

In a second stage (b) of the first phase of the cycle shown in FIG. 6A, the operating member 88 is moved in translation by said first drive means 92:
- from said first position P1 in which said operating member 88 interacts with the member 52 for controlling the locking means 55 occupying the locked position
- toward said second position P2 in which said operating member 88 exerts a force, called the unlocking force, on the member 52 for controlling the locking means 55, such that said locking means 55 are brought to the unlocked position.

For this purpose, the control unit of the system 82 controls the first drive means 92 in order to move the actuating rod 98 along a second stroke T2 corresponding to a movement of the operating member 88 from the first position P1 toward the second position P2.

The second position P2 corresponds to a position in which said operating member 88 has exerted said unlocking force on the member 52 for controlling the locking means 55, in opposition to the member 66 for the resilient return of the locking device 50, and said locking means 55 are therefore in the unlocked position.

When the drive member 62 carrying the locking fingers 60 forming part of the locking means 55 slides to reach said unlocked position, the recess 76 of the securing means 72 of the securing mechanism 70 is positioned next to the pin 74.

At this point, the securing means 72 are not yet in the active securing position in which they immobilize the locking means 55 in the unlocked position.

This is because the molding unit 24 is still in the closed position, and therefore the branch 54 pushes the end of the finger 80 in opposition to the resilient return member 78 in such a way that the securing means 72 are still kept in the inactive securing position.

The unlocking force exerted by the operating member 88 on the member 52 for controlling the locking means is then maintained, as otherwise the resilient return means 66 would automatically return the locking means 55 toward the locked position.

In a third stage (c) of the first phase of the cycle shown in FIG. 6A, the operating member can be moved in rotation by said second drive means 94 from said second position P2, in which said operating member 88 pushes the member 52 for controlling the locking means 55 to the unlocked position, toward the third position P3.

The third position P3 is reached after said operating member 88 has exerted a force called the opening force on the control member 52, during the stroke T, such that at least one of the mold holders 26 is moved in rotation about the axis O, and such that the mold holders 26 finally occupy said open position of the molding unit 24.

For this purpose, the control unit of the system 82 controls the second drive means 94 in order to move the actuating rod 104 along a stroke T such that the support part 96 is pivoted according to the arrow R about the pivot 100, in other words such that the operating member 88 is moved from said second position P2 toward the third position P3.

From the start of the opening of the mold holders 26, the branch 54 is disengaged from between the branches 56 and ceases to push on the finger 80, and therefore the securing means 72 are automatically returned by the resilient return member 78 toward the active securing position, in other words the position in which the pin 74 is inserted into the recess 76 to immobilize the locking means 55 in the unlocked position.

From this point, therefore, regardless of whether the operating member 88 does or does not continue to exert said unlocking force on the control member 52, the locking means 55 are kept in the unlocked position by the securing means 72 in opposition to the resilient return means 66 which tend to return them automatically toward the locked position.

The molding unit 24 is then in the open position, and the operator is free to release the molding elements 28, by acting on the fastening means between the latter and the mold holders 26, by means of which said molding elements 28 are dismounted.

The dismounting of the molding elements 28 (FIG. 6A) is followed by the mounting and fastening of new molding elements 28 in the mold holders 26, said mounting operation (FIG. 6B) also being carried out by the operator.

When said mold changing of the molding unit 24 is finished, the first phase of the mold changing cycle is complete and the system 82 is controlled so as to start the second phase of the cycle.

The second phase of the changing cycle provides for the execution, in reverse order, of stages (a), (b) and (c) described above for the first phase of the cycle with reference to FIG. 6A.

Thus, in a fourth stage (d) of the second phase of the cycle, the operating member 88 is moved in rotation by said second drive means 94 from said third position P3 toward said second position P2.

For this purpose, the control unit of the system 82 controls the second drive means 94 in order to move the actuating rod 104 along a stroke opposite to the stroke T such that the support part 96 is pivoted in the reverse direction about the pivot 100, in other words such that the operating member 88 is moved from the third position P3 toward said second position P2.

Thus the second position P2 is again reached after said operating member 88 has exerted a force called the closing force on the control member 52, during said opposite stroke to the stroke T, such that at least one of the mold holders 26 is moved about the axis O of rotation, and such that the mold holders 26 finally occupy said closed position of the molding unit 24 at the end of this fourth stage (d).

When the molding unit 24 reaches the closed position at the end of the fourth stage, the finger 80 is pushed by the branch 54, thus causing the securing means 72, a sliding piece in this case, to slide in opposition to the return member 78 in such a way that the pin 94 is disengaged from the recess 96 and the securing means 72 then cease to occupy the active position and enter the inactive position in which the locking means 55 are free to be returned toward the locked position by the resilient return means 66.

However, the locking means 55 are kept in the unlocked position, because the operating member 88 occupying said second position P2 immobilizes the control member 52 and consequently the drive member 62.

In a fifth stage (e) of the second phase of the cycle, the operating member 88 is therefore moved in translation by said first drive means 92, at least:

from said second position P2 in which said operating member 88 interacts with the member 52 for controlling the locking means 55 occupying the unlocked position, toward said first position P1 in which said operating member 88 exerts a force, called the locking force, on the member 52 for controlling the locking means 55, such that said locking means 55 are brought to the locked position.

The movement of the operating member 88 toward the first position P1, releasing the control member 52, allows the return means 66 of the locking device 50 to return the locking means 55 automatically to the locked position.

In a variant, in the absence of the resilient return means 66, the operating member 88 is modified (with an open housing 90) so as to be capable of exerting said locking force on the control member 52 in such a way that said locking means 55 are brought to the locked position.

By way of non-limiting example, the operating member 88 is made, in this case, in the form of a gripper which can be controlled selectively at least in opening to grip the member 52 for controlling the locking means 55.

Advantageously, the presence of resilient return means 66 of the locking means 55 enables the shape of the operating member 88 to be simplified.

It should be noted that the presence of a securing mechanism 70 has no effect on the operating mode, called the intervention mode, of the machine 10, since the operating member 88 of the module 84 of the system 82 can be kept in the second position P2 by the first drive means 92.

This is because it will be found that the movement of the operating member 88 caused by the second drive means 94 controlled by the control unit of the system 82 to carry out the opening operation (stage c) or closing operation (stage d) does not in any way require the operating member 88 to occupy said second position P2, but if this is the case it is possible to proceed immediately to the locking as soon as the closed position of the molding unit 24 is reached.

The second phase of the cycle is completed by a sixth stage (f) in which the operating member 88 is moved beyond the first position P1 toward the retracted position P0 corresponding to the standby state of the system 82.

Preferably, the control unit of the system 82 controls the first drive means 92 so as to move the operating member 88 in translation beyond said position P1, advantageously as far as the retracted position P0.

On completion of the mold changing cycle of the molding unit 24 occupying the specified position relative to the module 82, the control unit of the machine 10 then controls the drive means to cause the carousel 22 to rotate by a given amount to bring another molding unit 24 to the reference position.

By way of example, the carousel 22 is rotated by an amount equal to the pitch of the machine, in other words the interval between two consecutive molding units 24, in order to bring the next molding unit 24 (No. 2) to said specified reference position relative to the module 84 of the system 82.

In a variant, the control unit controls the drive means of the machine 10 to cause the carousel 22 to rotate through two pitches, for example if the mold of only one molding unit 24 out of every two is to be changed.

The mold changing cycle according to stages (a) to (f) described above is then recommenced for the purpose of changing the mold of said molding unit 24, with the assistance of the system 82 for the operations of unlocking and locking the locking device 50 and opening and closing the molding unit 24.

The presence of the system 82 according to the invention makes it possible to reduce the total time required to change the molds of all or some of the series of molding units 24 carried by the carousel 22 of the machine 10, by reducing the time required for changing the mold of each molding unit 24.

Advantageously, the total time required to change the molds of the series of molding units 24 of the machine 10 can be reduced further by using more than one module 84.

Preferably, therefore, the machine 10 includes at least two modules 84, such as modules of the same type as the module 84 of the system 82, called a single-station system, described in the first embodiment and illustrated in FIG. 5, and each of said modules 84 can handle one molding unit 24 which, when occupying a specified reference position, is associated with the module during the execution of the mold changing cycle.

In a first embodiment of a system 82 of this "multi-station" type, the system 82 includes at least two modules 84 which are separate and each of which is arranged in a specified intervention area of the machine.

Advantageously, a module 84 of the system 82 is arranged in one of the intervention areas of the machine 10, chosen from among a first right lateral area Z1 or a second left lateral area Z2 or a third rear area Z3 of the machine 10, this third area Z3 being diametrically opposite said areas Zi and Ze of the front part of the machine, while at least one other module 84 is arranged in one of these areas Z1 or Z2 or Z3 where no module is already present.

Advantageously, the enclosure 31 has access doors to said intervention areas Z1, Z2 or Z3, which are indicated by hatching in FIG. 1 to make them visible.

Advantageously, said areas Z1, Z2 and Z3 are areas in which the molding units 24 are in the closed position when the machine 10 is operating in the mode for production of containers 14'.

Consequently all of these areas are advantageously free of guide means such as cams intended to interact with said at least one roller 44 fixed to the arm 42 and forming with the latter, for each molding unit 24, said member 48 for controlling its opening/closing device 46.

In the absence of these guide means, the member 48 for controlling the opening/closing device 46 of each molding unit 24 is totally free to move in said areas Z1 to Z3, and consequently said member 48 does not in any way oppose the actuation of the control member 52 by the operating member 88 to cause the rotation of the mold holders 26 between said open and closed positions, said rotation taking place about the axis O of rotation.

Preferably, the modules 84 are then controlled so as to execute said mold changing cycle in a synchronized way.

Preferably, a control unit of the system 82 then simultaneously controls each of the modules 84 so as to synchronize each actuating device 86 during the execution of a mold changing cycle, notably in order to control in a synchronized way the first and second drive means 92 and 94 of each module 84.

Consequently, the number of molding units 24 handled is at least doubled for a given period corresponding to a complete mold changing cycle, or, in other words, the total time required to change the molds of a machine 10 is at least halved.

Advantageously, the control unit of the system 82 controls said modules 84 simultaneously so that each of them completes said mold changing cycle without any change occurring in the specified reference positions of the associated molding units 24.

In a variant, the control unit of the system 82 controls said modules 84 in succession, either with a specified time interval between them or one after another, in such a way that each of them completes said mold changing cycle without any change occurring in the position of the molding units 24.

In a second embodiment of a system 82 of this "multi-station" type, the system 82 includes at least two modules 84 which are grouped together, notably to facilitate their control in a synchronized way and to share some of the means between at least two modules 84.

A description will now be given of a second embodiment of a system 82 for providing assistance when changing molds according to the invention which is principally characterized in that said system 82 includes two modules 84.

The system 82 according to this second embodiment will be described hereafter by comparison with the first embodiment and with reference to FIGS. 7 and 8.

Figure 8:
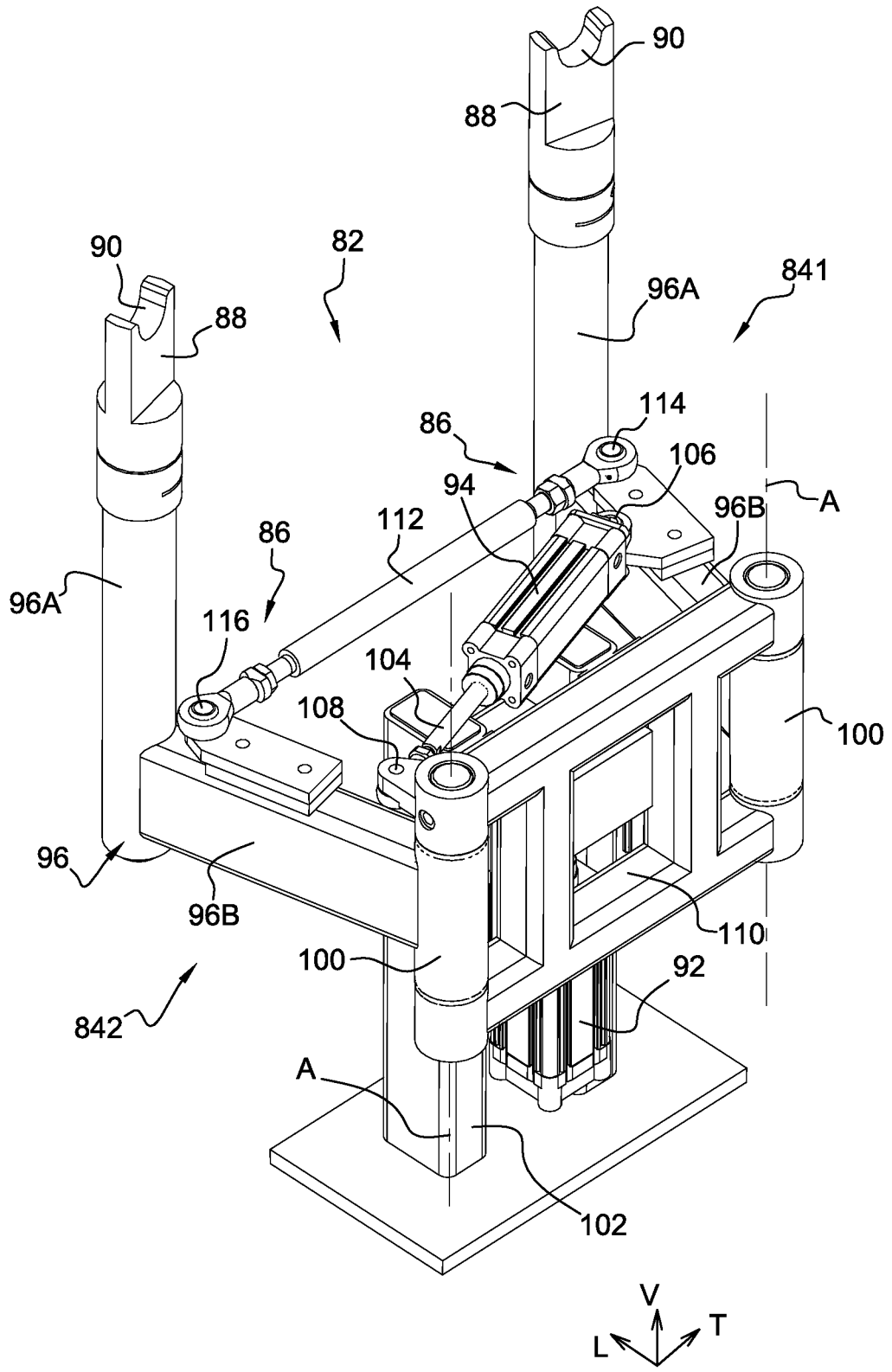

As shown in FIGS. 7 and 8, the system 82 according to this second embodiment includes two modules, namely a first module 841 and a second module 842, which are each similar to the module 84 shown in FIG. 5 and described above.

Advantageously, the same references have therefore been used to indicate identical elements of each of the modules 841, 842.

In this second embodiment, the system 82 includes at least two juxtaposed modules 841, 842.

Advantageously, said juxtaposed modules 841, 842 of the system 82 are arranged in a specified area of the machine, called the intervention area.

Preferably, said specified intervention area of the machine 10 is chosen from among the first right lateral area Z1, a second left lateral area Z2, and a third rear area Z3 of the machine 10.

Advantageously, the system 82 includes first linking means 110 which link in movement the operating members 88 of the two modules 841, 842 whose first common drive means 92 act on said first linking means 110.

Preferably, the first linking means 110 are made in the form of a structure to the transverse ends of which the pivots 100 of each of the modules 841, 842 are linked.

Said structure forming the first linking means 110 is in this case connected centrally to a base 102 which is common to the modules 841, 842 and can be actuated by the first common drive means 92 to cause its movement in translation in the vertical direction between the positions P0, P1 and P2.

Advantageously, the first drive means 92 are shared between said modules 841, 842.

Because the operating members 88 are driven simultaneously by said first common drive means 92, and because of the first linking members 110, the movements of the operating members 88 of the modules 841, 842 are synchronized, notably as regards the movements in translation of said operating members 88 between the first and second positions P1, P2, corresponding to the locked and unlocked positions.

Advantageously, the system 82 includes second linking means 112 which link in movement said operating members 88 of said at least two modules 841 and 842 whose second common drive means 94 can act on said second linking means 112.

Preferably, the second linking means 112 are made in the form of a bar which forms a link between the support parts 96 of the operating members 88 of each module 841, 842.

The bar includes an end which is connected by a pivoting link 114 to the branch 96B of the support part 96 of the operating member 88 of the module 841, and another end which is connected by a pivoting link 116 to the branch 96B of the support part 96 of the operating member 88 of the module 842.

Because of the second linking means 112, the operating members 88 are linked in movement by means of their support parts 96 which are respectively mounted movably in rotation about an axis A of rotation of a pivot 100 carried by the first linking means 110.

Preferably, the second linking means 112 are of variable length or can be easily dismounted for replacement with other bars of different length, the length being specified according to the pitch between the molding units 24 handled in the mold changing cycle by the juxtaposed modules 841 and 842 of the system 82.

Advantageously, the second drive means 94 are also arranged transversely between said support parts 96 of the operating members 88 of each of the modules 841, 842 and are shared between said modules 841 and 842.

Because of the second linking means 112, said second common drive means 94 simultaneously drive and thereby move the operating members 88 of the modules 841 and 842, notably while synchronizing the movements between the second and third positions P2, P3 corresponding to the open and closed positions, independently of the position P0, P1 or P2 occupied by each operating member 88.

In a variant, the system 82 includes first linking means 110 which link in movement the operating members 88 of the two modules 841, 842 but which have separate first drive means 92 which can act selectively on the operating member 88 of each of said modules 841, 842.

Consequently the operating member 88 of each module 84 can be controlled selectively to move independently of the operating member 88 of any other module or modules 84.

Advantageously, the operating members 88 are notably movable simultaneously but also successively in translation between the positions P0, P1 and P2 by the control of the first drive means 92 of each module 841, 842 provided by the control unit of the system 82.

Advantageously, the system 82 includes at least two modules 841, 842 which are controlled by said control unit so that each of them executes said mold changing cycle without any change in the specified reference positions of the associated molding units.

A more detailed description will now be given of the operation of a system 82 according to the second embodiment by comparison with the first embodiment.

The mold changing cycle assisted by the system 82 including at least the modules 841 and 842 is identical in that it includes at least:

- a first phase of the cycle in which each operating member 88 of the actuating device 86 of one and other of the modules 841, 842 is successively moved from the first position P1 to the second position P2 and then from said second position P2 to the third position P3, and
- a second phase of the cycle in which each operating member 88 of the actuating device 86 of one and other of the modules 841, 842 is successively moved from the third position P3 to the second position P2 and then from said second position P2 to the first position P1.

In this second embodiment, the control unit of the system 82 controls the drive means 92, 94 simultaneously in such a way that the operating member 88 of each module 841 and 842 executes said mold changing cycle.

As described above with reference to FIG. 6A, the first phase of the mold changing cycle controlled by the control unit of the system 82 includes the following distinct stages.

The machine 10 is controlled by the control unit to bring the molding units 24 to the specified reference position relative to the system 82 and to the modules 841, 842.

In the first stage (a), the control unit of the system 82 controls said modules 841, 842 to bring the system 82 from the standby state to the state of use corresponding to the operating mode of the machine 10 called the intervention mode.

For this purpose, the first drive means 92 common to said modules 841, 842 are controlled by the control unit in such a way that the actuating rod 98 slides and pushes the structure forming the first linking means 110.

The first linking means 110 carrying the support parts 96 of each operating member 88 then slide vertically upward relative to the base 102 along a first given stroke corresponding to the translation of the operating members 88 from the retracted position P0 to the first position P1.

In the second stage (b), the control unit continues to control the first drive means 92 common to said modules 841, 842 to make the actuating rod 98 linked to the first linking means 110 slide vertically upward.

As a result, the operating members 88 are then moved along a second stroke from the first position P1 to the second position P2 so that each member actuates the member 52 for controlling the locking means 55 of the associated molding unit 24 and thus causes the unlocking of the locking device 50 of said molding unit 24 which can then be freely opened.

In the third stage (c), the control unit of the system 82 controls the second common drive means 94 so as to move the actuating rod 104 by sliding, this rod then pushing the operating member 88 of the module 841 with an opening force capable of causing pivoting about the axis A of rotation provided by the pivot 100 from the second position P2 to the third position P3 associated with the open position of the molding unit 24.

The opening force is exerted, at the link 106, by the actuating rod 104 on the branch 96B of the support part 96 of the operating member 88 of the module 841, the other end of the rod 104 being free to pivot by means of the pivoting link 108 about the axis A of the pivot 100 of the other module 842.

Because of the second linking means 112, the rotation of each of the support parts 96 carrying the operating members 88 is synchronized and takes place simultaneously for both modules 841 and 842 of the system 82.

When the open position has been reached, at least one operator, but preferably two operators, can then intervene to carry out the dismounting and then the mounting of the molding elements 28 of each molding unit 24.

As before, the mold changing cycle is then continued in a second phase which includes the fourth, fifth and sixth stages (d) to (f), which correspond, respectively, to movements in the reverse direction relative to the stages (c), (b) and (a) of the first phase of the cycle.

When the mold changing cycle is completed, mold changing will have been carried out, in the same time interval as previously, on two molding units 24 instead of one unit.

The machine 10 is then made to rotate by the control unit which controls the drive means so as to bring a new pair of molding units 24 to said specified reference position in order to repeat simultaneously for each of them said mold changing cycle which has just been described.

Advantageously, the system 82 therefore includes at least two modules 841, 842 which are controlled simultaneously by said control unit in such a way that each of them completes said mold changing cycle without any change occurring in the specified reference position of each of the molding units 24 associated with the modules 841, 842 during the cycle.

In a variant, the control unit of the system 82 controls the drive means 92, 94 in succession, in such a way that the operating members 88 of each of the modules 841, 842 execute said mold changing cycle one after the other.

This variant is used particularly when the space between two consecutive molding units 24 is such that the two molding units 24 cannot simultaneously be in the open position for the dismounting and mounting of the molding elements 28.

A description will now be given, by comparison and with reference to FIG. 9, of a third embodiment of the system 82 for providing assistance when changing molds according to the invention.

Preferably, the following description of this third embodiment relates to the case in which the space between two consecutive molding units 24, in other words the pitch, is insufficient to allow the simultaneous opening of two consecutive molding units 24.

Consequently, at least some of the operating members 88 of the drive devices 86 of the modules are controlled by the control unit of the system to execute said mold changing cycle, and it is only when this operation is complete that the other remaining operating members 88 are controlled in such a way that they also execute said mold changing cycle.

Advantageously, the two mold changing cycles are executed successively, one after the other, without any movement of the molding units 24 from their specified reference positions before the completion of said cycles.

Figure 9:
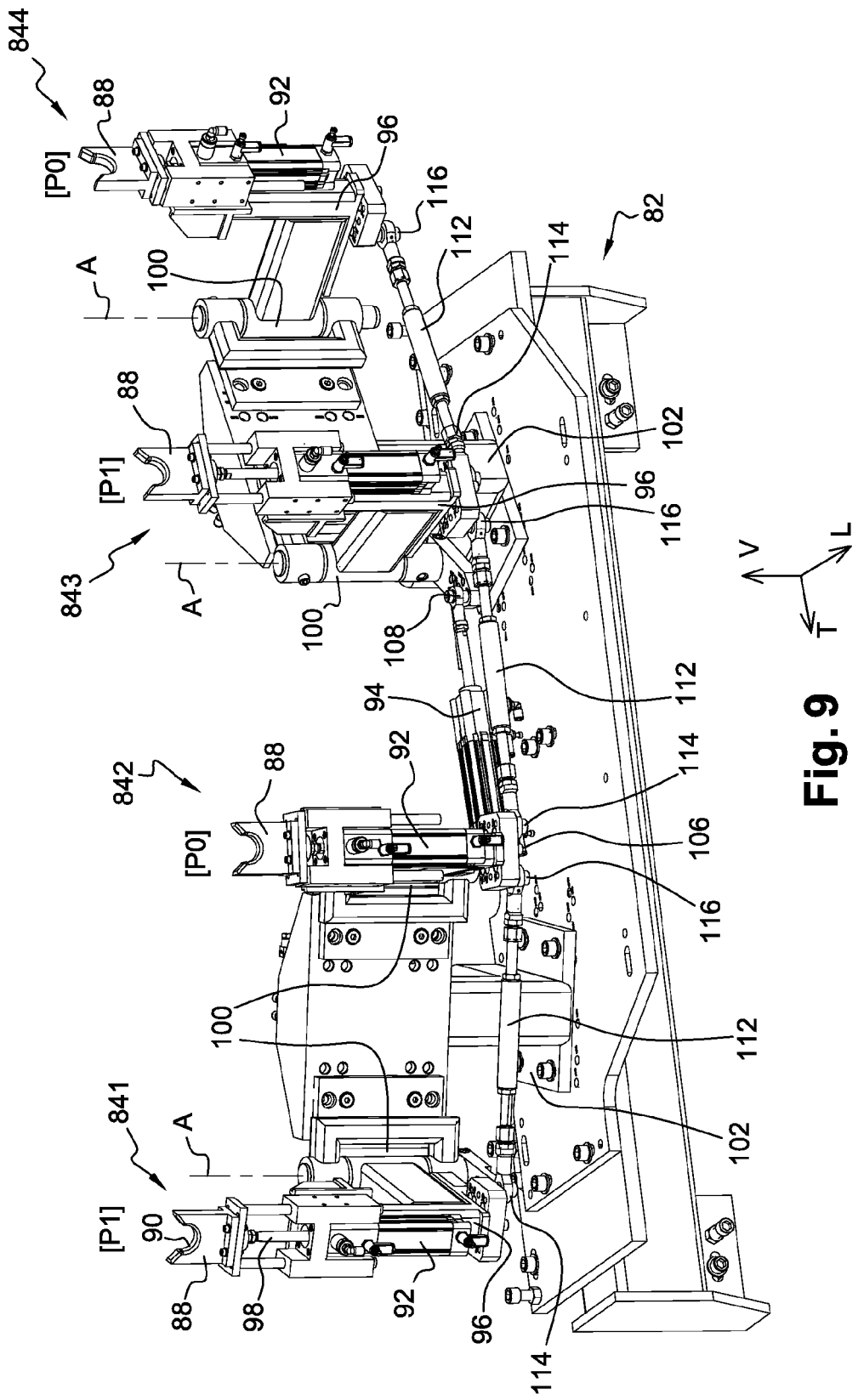
FIG. 9 is a perspective view showing a system according to a third embodiment of the invention and illustrating said system with four modules intended to be controlled successively in groups of two.

As shown in FIG. 9, the system 82 includes at least four juxtaposed modules, identified by the references 841, 842, 843 and 844.

Advantageously, the system 82 includes at least:
- a first group of modules including at least the first module 841 and the third module 843 between which a second module 842 is interposed, and
- a second group of modules including at least said second module 842 and a fourth module 844 between which the third module 843 is interposed.

Advantageously, the system 82 in this third embodiment again includes second linking means 112 which link in movement said support parts 96 of the operating members 88 of said modules 841, 842, 843 and 844, the second common drive means 94 being shared between the four modules and capable of acting on said second linking means 112.

The second linking means 112 therefore synchronize the rotational movement of the operating members 88 of the four modules.

For this reason, each of the four modules 841, 842, 843 and 844 of the system 82 advantageously includes first drive means 92 of the operating member 88 of said module, so that the movement of each operating member 88 can be controlled selectively, notably to move between said first and second positions P1 and P2, but also to move to the retracted position P0.

As shown in FIG. 9, when the first group including the modules 841 and 843 executes the first mold changing cycle, the operating members 88 of the modules 842 and 844 of the second group are then kept in the retracted position P0 in such a way that none of the operating members 88 of this second group can come into contact with another element such as a member 52 for controlling the locking means 55.

Similarly, when the second group including the modules 842 and 844 executes the first mold changing cycle, the operating members 88 of the modules 841 and 843 of the second group are also in the retracted position P0 so as to prevent any interference during the simultaneous rotation of the four modules 841, 842, 843 and 844 about the axes A of rotation of the pivots 100.

Advantageously, the control unit of the system 82 can control said modules in groups, in such a way that the modules of each group execute a complete mold changing cycle in succession, one after the other.

During the first cycle, the system 82 handles a first set of at least two molding units 24 associated with the modules 841, 843 of the first group, and then, during the second cycle, the system 82 handles a second set of at least two molding units 24 associated with the modules 842, 844 of the second group, each of the four molding units 24 occupying said specified reference position during the execution of these two cycles.

However, in a variant which is not shown, if the number of molding units 24 of the machine 10 is such that the opening of two adjacent molding units 24 is possible, the execution of the mold changing cycle is similar to that described above for the second embodiment.

This is because the control unit of the system 82 then simultaneously controls the four modules 841, 842, 843 and 844 which advantageously include at least second drive means 94 which are shared and are synchronized in their movement by second linking means 112.

Advantageously, when the first drive means 92 are not shared between the four modules, the system 82 is more multi-purpose, since it is equally possible to handle four molding units 24 either simultaneously or in succession in groups of two.

In a variant, the first drive means 92 are shared between at least two modules 84.

Clearly, in this variant, the four associated molding units 24 are handled simultaneously during a period corresponding to a single mold changing cycle.

Consequently, with a system 82 of this type, only half the time is required, for example, by comparison with a system according to the second embodiment for changing the molding elements 28 of the molding units 24, and only a quarter of the time is required by comparison with a single-module system 82 according to the first embodiment.

Clearly, the use of a system 82 according to the invention is not in any way limited to such a machine 10 of the rotary type shown in FIG. 1, and is not limited to the changing of a mold of a molding unit 24 of the book-opening type.

This is because, without departure from the scope of the invention, said system for providing assistance when changing molds could equally well be used with machines 10 called linear machines, in other words those which include at least one molding unit 24 whose mold holders 26 are mounted movably in translation (and not in rotation) between open and closed positions.

In a variant, the operating member can therefore be moved, for example, in translation between at least said second and third positions by second drive means to control the opening and closing of the mold holders of a molding unit.

More specifically, a system 82 of this type can actuate numerous locking devices between said locked and unlocked positions, and the locking device 50 described and illustrated in FIG. 4 is purely an example provided on a non-limiting basis.

Reference may be made, for example, to the prior art documents FR-A1-2.646.802, FR-2.856.334 or FR-2.863.930, which describe other designs of the locking device 50.

Clearly, the kinematics of the operating member 88 of the at least one module 84 included in the system 82 according to the embodiments is advantageously adapted to the locking device including locking means whose movement is to be controlled between the locked and unlocked positions.

In a variant, the operating member can be moved in translation in a horizontal plane instead of a vertical plane, to actuate a member for controlling the locking device, and to move the locking means directly or indirectly between said locked and unlocked positions.

Many other variants can be envisaged, particularly with the use of movement transformation or transfer mechanisms, the operating member being, for example, moved in translation to push the free end of a lever, fixed to a member for controlling the locking means, which is mounted movably in rotation.

In a variant, the operating member is for example capable of being moved in rotation to control the unlocking and locking operations.

The invention claimed is:

1. A machine (10) for manufacturing containers, notably bottles of thermoplastic material, which includes at least one molding unit (24) including:

at least two mold holders (26) which are mounted movably between an open position and a closed position of the molding unit (24), and a mold including at least two molding elements (28), each of which is fixed removably to one of the mold holders (26), and a locking device (50) of the molding unit (24) including at least one control member (52) capable of actuating locking means (55) which are mounted movably between:

a locked position in which the mold holders (26) of the molding unit (24) are kept in the closed position by said locking means (55), and an unlocked position in which the mold holders (26) are freely movable between the closed and open positions, characterized in that the machine (10) includes a system (82) for providing assistance when changing molds, which can be in at least a standby state associated with an operating mode of the machine (10) called the production mode, for manufacturing containers by means of the machine, and a state of use associated with another operating mode of the machine (10), called the intervention mode, for the purpose of at least changing the mold of said at least one molding unit (24), said system (82) including at least one module (84) associated with said at least one molding unit (24), said module (84) including an actuating device (86) which includes an operating member (88) intended to interact with said member (52) for controlling the locking means (55) when the molding unit (24) occupies a specified reference position relative to the module (84), said operating member (88) being capable of being driven and thereby moved so as to actuate said member (52) for controlling the locking means (55) in order to cause, on the one hand, the movement of the locking means (55) toward at least one of said locked and unlocked positions and, on the other hand, the movement of the mold holders (26) toward at least one of said open and closed positions of the molding unit (24).

2. The machine as claimed in claim 1, characterized in that the device (86) for actuating the module (84) of the system (82) includes first drive means (92) intended to move the operating member (88) selectively between at least:

a first position (P1) associated with the locked position of the locking means (55) of the molding unit (24), and a second position (P2) associated with the unlocked position of the locking means (55) of the molding unit (24).

3. The machine as claimed in claim 2, characterized in that the operating member (88) can be moved in translation by said first drive means (92), at least:

from said first position (P1) in which said operating member (88) interacts with the member (52) for controlling the locking means (55) occupying the locked position, toward said second position (P2) in which said operating member (88) exerts a force, called the unlocking force, on the member (52) for controlling the locking means (55), such that said locking means (55) are brought to the unlocked position.

4. The machine as claimed in claim 3, characterized in that the operating member (88) can be moved in translation by said first drive means (92), at least:

from said second position (P2) in which said operating member (88) interacts with the member (52) for controlling the locking means (55) occupying the unlocked position, toward said first position (P1) in which said operating member (88) exerts a force, called the locking force, on the member (52) for controlling the locking means (55), such that said locking means (55) are brought to the locked position.

5. The machine as claimed in claim 3, characterized in that the device (86) for actuating the module (84) of the system (82) includes second drive means (94) intended to move the operating member (88) between at least:

said second position (P2) in which the mold holders (26) of the molding unit (24) are in the closed position and in which the locking means (55) are in the unlocked position, and a third position (P3) in which the mold holders (26) of the molding unit (24) are in the open position.

6. The machine as claimed in claim 5, characterized in that the operating member (88) can be moved in rotation by said second drive means (94), at least:

from said second position (P2) in which said operating member (88) pushes the member (52) for controlling the locking means (55) into the unlocked position, toward a third position (P3), reached after said operating member (88) has exerted a force, called the opening force, on the control member (52), such that at least one of the mold holders (26) is made to move in such a way that the mold holders (26) occupy said open position of the molding unit (24).

7. The machine as claimed in claim 6, characterized in that the operating member (88) can be moved in rotation by said second drive means (94), at least:

from said third position (P3), toward said second position (P2), reached after said operating member (88) has exerted a force, called the closing force, on the control member (52), such that at least one of the mold holders (26) is made to move in such a way that the mold holders (26) occupy said closed position of the molding unit (24).

8. The machine as claimed in claim 6, characterized in that the operating member (88) of the module (84) of the system (82) is capable of pivoting, between said second and third positions (P2, P3), about an axis (A) of rotation which is coaxial with an axis (O) of rotation about which at least one of the mold holders (26) is mounted so as to be movable in rotation between said open and closed positions, respectively, of the molding unit (24) occupying said specified reference position relative to the module (84).

9. The machine as claimed in claim 2, characterized in that the operating member (88) of the device (86) for actuating said at least one module (84) of the system (82) is mounted movably between at least:

a retracted position (P0) corresponding to the standby state of the system (82) associated with the operating mode of the machine (10), called the production mode, for the manufacture of containers by the machine (10), and said first position (P1) corresponding to the state of use of the system (82) associated with the other operating mode of the machine (10), called the intervention mode, for the purpose of at least changing the mold of at least one molding unit (24), and in that the first drive means (92) of at least said operating member (88) form means for controlling the change of state of the system (82) between said standby state and said state of use.

10. The machine as claimed in claim 9, characterized in that the system (82) includes a control unit intended to control at least one module (84), said unit being capable of controlling selectively and sequentially, according to a mold changing cycle, at least said first and second drive means (92, 94) of the device (86) for actuating the module (84) of the system (82) in the state of use, said cycle including at least:

a first phase of the cycle in which the operating member (88) of the actuating device (86) is successively moved from the first position (P1) to the second position (P2) and then from said second position (P2) to the third position (P3), and a second phase of the cycle in which the operating member (88) of the actuating device (86) is successively moved from the third position (P3) to the second position (P2) and then from said second position (P2) to the first position (P1).

11. The machine as claimed in claim 1, characterized in that the system (82) includes at least two juxtaposed modules (84) arranged in a specified area (Z1, Z2, Z3) of the machine (10), called the intervention area.

12. The machine as claimed in claim 1, characterized in that the system (82) includes at least two separate modules (84), each arranged in a specified intervention area (Z1, Z2, Z3) of the machine.

13. The machine as claimed in claim 11, characterized in that the system (82) includes, respectively:

first linking means (110) which link in movement the operating members (88) of at least two modules (84) whose first common drive means (92) act on said first linking means (110), and second linking means (112) which link in movement said operating members (88) of said at least two modules (84) whose second common drive means (94) can act on said second linking means (112).

14. The machine as claimed in claim 11, characterized in that the system (82) includes, respectively:

first linking means (110) which link in movement the operating members (88) of at least two modules (84) whose first separate drive means (92) can act selectively on the operating member (88) of each of said modules (84), and second linking means (112) which link in movement said operating members (88) of said at least two modules (84) whose second common drive means (94) act on said second linking means (112).

15. The machine as claimed in claim 10, characterized in that the system (82) for providing assistance when changing molds includes at least two modules (84) which are controlled by said control unit so that each of them executes said mold changing cycle without any change in the specified reference positions of the associated molding units (24).

16. The machine as claimed in claim 7, characterized in that the operating member (88) of the module (84) of the system (82) is capable of pivoting, between said second and third positions (P2, P3), about an axis (A) of rotation which is coaxial with an axis (O) of rotation about which at least one of the mold holders (26) is mounted so as to be movable in rotation between said open and closed positions, respectively, of the molding unit (24) occupying said specified reference position relative to the module (84).

17. The machine as claimed in claim 3, characterized in that the operating member (88) of the device (86) for actuating said at least one module (84) of the system (82) is mounted movably between at least:

a retracted position (P0) corresponding to the standby state of the system (82) associated with the operating mode of the machine (10), called the production mode, for the manufacture of containers by the machine (10), and said first position (P1) corresponding to the state of use of the system (82) associated with the other operating mode of the machine (10), called the intervention mode, for the purpose of at least changing the mold of at least one molding unit (24), and in that the first drive means (92) of at least said operating member (88) form means for controlling the change of state of the system (82) between said standby state and said state of use.

18. The machine as claimed in claim 17, characterized in that the system (82) includes a control unit intended to control at least one module (84), said unit being capable of controlling selectively and sequentially, according to a mold changing cycle, at least said first and second drive means (92, 94) of the device (86) for actuating the module (84) of the system (82) in the state of use, said cycle including at least:

a first phase of the cycle in which the operating member (88) of the actuating device (86) is successively moved from the first position (P1) to the second position (P2) and then from said second position (P2) to the third position (P3), and a second phase of the cycle in which the operating member (88) of the actuating device (86) is successively moved from the third position (P3) to the second position (P2) and then from said second position (P2) to the first position (P1).

* * * * *